(12) United States Patent
Kobayashi et al.

(10) Patent No.: US 7,183,539 B2
(45) Date of Patent: Feb. 27, 2007

(54) OPTICAL SYSTEM FOR DISPLAYING IMAGE AND IMAGE DISPLAY APPARATUS

(75) Inventors: Shuichi Kobayashi, Kanagawa (JP); Shoichi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/847,119

(22) Filed: May 17, 2004

(65) Prior Publication Data
US 2004/0232322 A1 Nov. 25, 2004

(30) Foreign Application Priority Data
May 20, 2003 (JP) .............................. 2003-141926

(51) Int. Cl.
*G02B 27/10* (2006.01)
(52) U.S. Cl. ........................ 250/235; 359/627
(58) Field of Classification Search ................ 250/235; 359/627, 619, 563, 519; 358/487, 497, 471, 358/474, 506, 475
See application file for complete search history.

(56) References Cited

U.S. PATENT DOCUMENTS

| 5,467,104 A | 11/1995 | Furness, III et al. |
| 5,606,447 A | 2/1997 | Asada et al. |
| 5,701,132 A | 12/1997 | Kollin et al. |
| 5,706,137 A | 1/1998 | Kelly |
| 5,757,544 A | 5/1998 | Tabata et al. |
| 5,982,553 A * | 11/1999 | Bloom ........................ 359/627 |
| 6,222,676 B1 | 4/2001 | Togino et al. |
| 6,266,194 B1 | 7/2001 | Tanijiri et al. |
| 6,333,820 B1 | 12/2001 | Hayakawa et al. |

FOREIGN PATENT DOCUMENTS

| EP | 0 704 739 | 4/1996 |
| JP | 07-175005 | 7/1995 |
| JP | 08-334723 | 12/1996 |

OTHER PUBLICATIONS

Helsel et al., "Wafer Scale Packaging for a MEMS Video Scanner", SPIE, Conferenced4 #4407-19 (Jun. 2001). (7pp).

* cited by examiner

*Primary Examiner*—Thanh X. Luu
*Assistant Examiner*—Tony Ko
(74) *Attorney, Agent, or Firm*—Morgan & Finnegan, LLP

(57) ABSTRACT

An optical system is disclosed which has a small size as a whole and capable of suppressing loss in the light amount in a separating member even when a relatively large-sized scanning device and a reflective diffusing member are used. The optical system comprises a scanning optical system including a scanning device which scans a light flux from a light source at a scanning point and a display optical system which leads an image formed by the scanned light flux to an exit pupil of the optical system. An optical path of the scanning optical system and an optical path of the display optical system have a mutually overlapping part, and the optical paths are separated by a separating member. The scanning optical system forms a conjugate point conjugate with the scanning point at substantially a position of the separating member.

10 Claims, 9 Drawing Sheets

OPTICAL SYSTEM FOR DISPLAYING IMAGE AND IMAGE DISPLAY APPARATUS

BACKGROUND OF THE INVENTION

1. Field of the Invention

The present invention relates to an optical system for displaying an image by scanning a light flux from a light source by using a scanning device and a scan-type image display apparatus provided with the same.

2. Description of the Related Art

Some electronic viewfinder apparatuses to be used in head-mounted-type display apparatuses (hereinafter, referred to as head-mounted displays), digital cameras and the like use a two-dimensional display element, which is so called a flat panel display, such as a transmission-type liquid crystal element, reflection-type liquid crystal elements, or organic EL elements. And, these structured by combining a two-dimensional display element with an ocular optical system for observing a displayed image as a virtual image have been proposed in large numbers.

In recent years, in such image display apparatuses, since higher definition images have been demanded, the number of pixels formed on their flat panel displays has also been increasing. However, with the increase in the number of pixels, pixel defects increase, and the size of the pixels is relatively reduced in comparison with the flat panel size, thus manufacturing becomes more difficult.

In addition, a scan-type image display apparatus using a scanning device without using a two-dimensional image display element has been disclosed in U.S. Pat. No. 5,467,104, etc. U.S. Pat. No. 5,467,104 discloses a technique which scans a light flux of R, G, and B in a horizontal direction and in a vertical direction and forms an image directly on the retina of an observer through an optical system.

However, in the scan-type image display apparatus disclosed in the above-described U.S. Pat. No. 5,467,104, optical scanning is required to be performed at very high speed, and therefore, a very small device is used as a scanning device for scanning light such as a mirror. Accordingly, the scanned light flux becomes extremely thin, and the light flux at the position of the pupil of the observer also becomes very small in diameter.

Techniques disclosed in U.S. Pat. No. 5,701,132 and in U.S. Pat. No. 5,757,544 can be mentioned as a method for enlarging such an exit pupil having a small diameter. In U.S. Pat. No. 5,701,132, by disposing an enlarging system, such as a lens array or a diffusing plate, on an intermediate image surface having a curvature formed by a scanned light flux, the divergence angle of a light flux which has passed through the enlarging system is increased.

Likewise, in U.S. Pat. No. 5,757,544, an exit pupil is enlarged by allowing light which has been incident into an image display element, such as a liquid crystal element illuminated with a parallel light flux, to pass through a diffusing plate, although the apparatus disclosed in this patent is not a scan-type image display apparatus.

However, in the structures disclosed in these U.S. patents, since the exit pupil enlarging system of the intermediate image transmission type is used, an optical path becomes long, and the apparatus is enlarged in size.

On the other hand, with the advance of semiconductor processes, it becomes possible to realize, by a Micro Electro Mechanical System (MEMS), a technique to manufacture a small-sized, lightweight, and high-speed scanning device.

Scanning devices manufactured by use of semiconductor processes have been disclosed in Japanese Patent Application Laid-Open No. H07(1995)-175005 (corresponding to U.S. Pat. No. 5,606,447) and Japanese Patent Application Laid-Open No. H08(1996)-334723. Also, similarly, in SPIE, Conference #4407-19 (June 2001), "Wafer scale packaging for a MEMS video scanner", there is an introduction concerning a MEMS of a two-dimensional scanning device for a head-mounted-type display apparatus.

In the techniques disclosed in U.S. Pat. No. 5,701,132 and in U.S. Pat. No. 5,757,544, since the exit pupil enlarging system of the intermediate image transmission type is used, an optical path becomes long, however, for avoidance thereof, folding the optical path by using a light diffusing member of a reflection type can be considered. Owing to this effect, an optical system can be structured in a small size, however, on the other hand, since an optical path of light which is incident on the reflection-type light diffusing member and an optical path of light which is reflected and diffused are overlapped, a separating means for separating the optical paths is required. Although using a semi-transmission-type mirror or the like can be considered as a means for separating the optical paths, loss in the light amount occurs in the semi-transmission-type mirror.

On the other hand, by making good use of diffusing characteristics of light, a structure as shown in FIG. 1 can be considered as a means for separating optical paths. A description will be given for a case where a light flux 505 from an unillustrated light source is scanned by means of a scanning device 502 on a screen 503. A structure has been provided so that, through an unillustrated optical system, the light flux 505 forms a light source image on a screen 503, and when the scanning device 502 tilts around an axis 501 as its center, this scans light as shown by 504a, 504b and 504c in the drawing. If diffusion is provided for the light reflective member (screen) 503, reflected light is diffused as shown by diffused light fluxes 506a and 506b and is reflected in directions different from those of the incident light fluxes 504a to 504c. If an optical path separating member 507 such as a mirror with a hole is placed in the surroundings of the scanning device 502, only a greatly diffused light component out of the diffused light fluxes 506a and 506b is reflected, therefore, it becomes possible to separate the incident light flux from the diffused emergent light flux with a small light amount loss. However, like the incident light flux 504a, a light flux which proceeds to the center of the screen 503 becomes a component, out of the diffused light fluxes 506a and 506b, close to a regular reflection, and since this component does not hit the optical path separating member 507, an amount equivalent thereto results in a light amount loss.

Accordingly, in order to reduce the loss caused by an optical path separation, it is important to reduce the area of an opening to install the scanning device 502 in the optical path separating member 507 by, for example, downsizing the scanning device 502 as much as possible.

However, in the MEMS scanning devices disclosed in Japanese Patent Application Laid-Open No. H07 (1995)-175005 and Japanese Patent Application Laid-Open No. H08 (1996)-334723, etc., a torsion bar exists around the scanning surface (reflective surface), and if a mirror with a hole is used as a light separating member, this hole (opening portion) increases in size.

Moreover, particularly in the MEMS scanning devices described in Japanese Patent Application Laid-Open No. H08 (1996)-334723 and SPIE, Conference #4407-19 (June 2001), "Wafer scale packaging for a MEMS video scanner", etc., a cover glass exists at a position distant from the scanning surface in some cases, wherein the necessity for increasing the opening of the light separating member in size arises, thus it is difficult to make the light separating member function effectively.

SUMMARY OF THE INVENTION

It is an object of the present invention to provide an optical system having a small size as a whole and capable of suppressing loss in the light amount in the separating member even when a relatively large-sized scanning device and a reflective diffusing member are used, and to provide a scan-type image display apparatus provided with the same.

In order to achieve the above-described object, an optical system as one aspect of the present invention comprises a scanning optical system including a scanning device which scans a light flux from a light source at a scanning point and a display optical system which leads an image formed by the scanned light flux to an exit pupil of the optical system. Herein, an optical path of the scanning optical system and an optical path of the display optical system have a mutually overlapping part, and the optical paths are separated by a separating member. The scanning optical system forms a conjugate point conjugate with the scanning point at substantially a position of the separating member.

Features of the optical system and the scan-type image display apparatus of the present invention will be apparent from a description of specific embodiments given below with reference to the attached drawings.

DETAILED DESCRIPTION OF THE PREFERRED EMBODIMENTS

Hereinafter, embodiments of the present invention will be described in detail with reference to the drawings.

Figure 2:
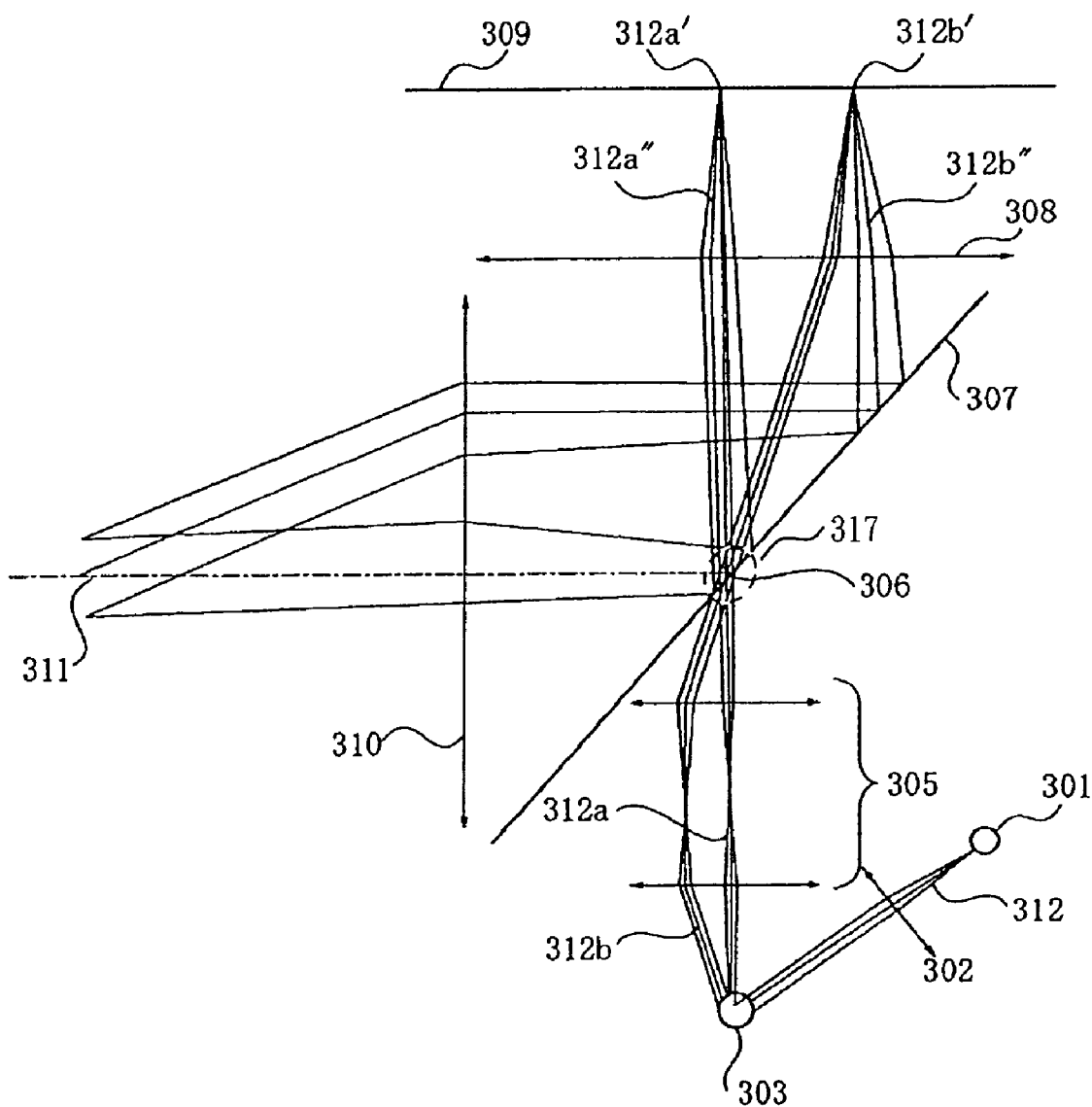
FIG. 2 is a schematic explanatory view of an optical system commonly used for Embodiments of the present invention.

FIG. 2 shows a structure common in optical systems of Embodiments 1–3 of the present invention, which will be described later. The optical systems of Embodiments 1–3 can be used as optical systems for head-mounted displays and optical systems for electronic viewfinder apparatuses used in digital cameras or video cameras, etc.

A light source 301 is a light source which is modulated in response to an input signal, and a light flux 312 emitted from the light source 301 is made into beams by a condenser optical system 302 and proceeds to a deflection point 303, which is a scanning point. At the deflection point 303, a reflection-type scanning device is provided, and the light flux 312 is deflected at this deflection point 303. For example, 312a and 312b are shown as light flux examples different in the deflection angles.

A pupil image-forming optical system 305 is structured so that a pupil conjugate point 306 having a conjugate relationship with the deflection point 303 is formed outside the pupil image-forming optical system 305, and the scanned light fluxes 312a and 312b pass through the pupil conjugate point 306. The pupil conjugate point 306 is formed at substantially a position of a reflective member 307 (namely, at a position of the reflective member 307 or in the vicinity thereof), and the light fluxes 312a and 312b pass through a transmissive region 317 formed on a part of the reflective member 307. The light fluxes 312a and 312b passed through the transmissive region 317 are condensed on a scan surface 309 through an optical system 308. By carrying out control so as to synchronize drive of the scanning device with the light source 301 modulation, a desirable image is formed on the scan surface 309.

The scan surface 309 is structured as a surface having a reflective diffusing action. Accordingly, a light flux incident on the scan surface 309 is, by a reflection and diffusion, reflected toward the optical system 308. Diffused and reflected light fluxes 312a" and 312b" passed through the optical system 308, are mostly reflected by the reflective member 307, and proceed toward an optical system 310. Since the optical system 308 and optical system 310 have a function as an ocular optical system to observe an image formed on the scan surface 309, it becomes possible for an observer to observe the image by positioning his/her eyeball at a position corresponding to an exit pupil 311.

A part of the diffused and reflected light flux 312a" diffused and reflected at a condensing point 312a' on the scan surface 309 passes through the transmissive region 317 corresponding to the pupil conjugate point 306 on the reflective member 307. Although this passing component is not reflected toward the optical system 310, since the area of the transmissive region 317 on the reflective member 307 can be reduced by providing the pupil conjugate point 306 on the reflective member 307, loss of the light can be reduced by controlling the amount of diffusion.

Figure 3:
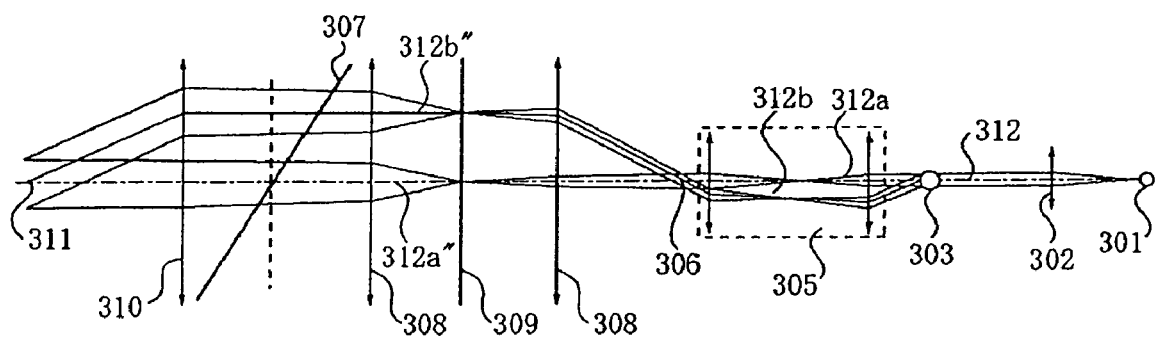
FIG. 3 is an optical path development of the optical system shown in FIG. 2.

FIG. 3 shows a structure explanatory view with the optical path of FIG. 2 developed, wherein structural components provided with symbols identical to those in FIG. 2 show functions identical to those of FIG. 2.

Since the pupil image-forming optical system 305 can form the pupil conjugate point 306, which is a conjugate point of the deflection point 303, in a space, the scan surface 309 is equivalent to being scanned from the pupil conjugate point 306, whereby restrictions for a mechanical component arrangement, etc., such as the scanning device can be reduced. In addition, since the deflection point 303 and pupil conjugate point 306 have a conjugate relationship, a product of an optical deflection angle θ of the scanning device and an effective area D thereof is fixed. Accordingly, it becomes possible, in such a case where a scanning device is manufactured by using the MEMS technique, to optimize the value of the product θD for the optical system using the scanning device.

Figure 1:
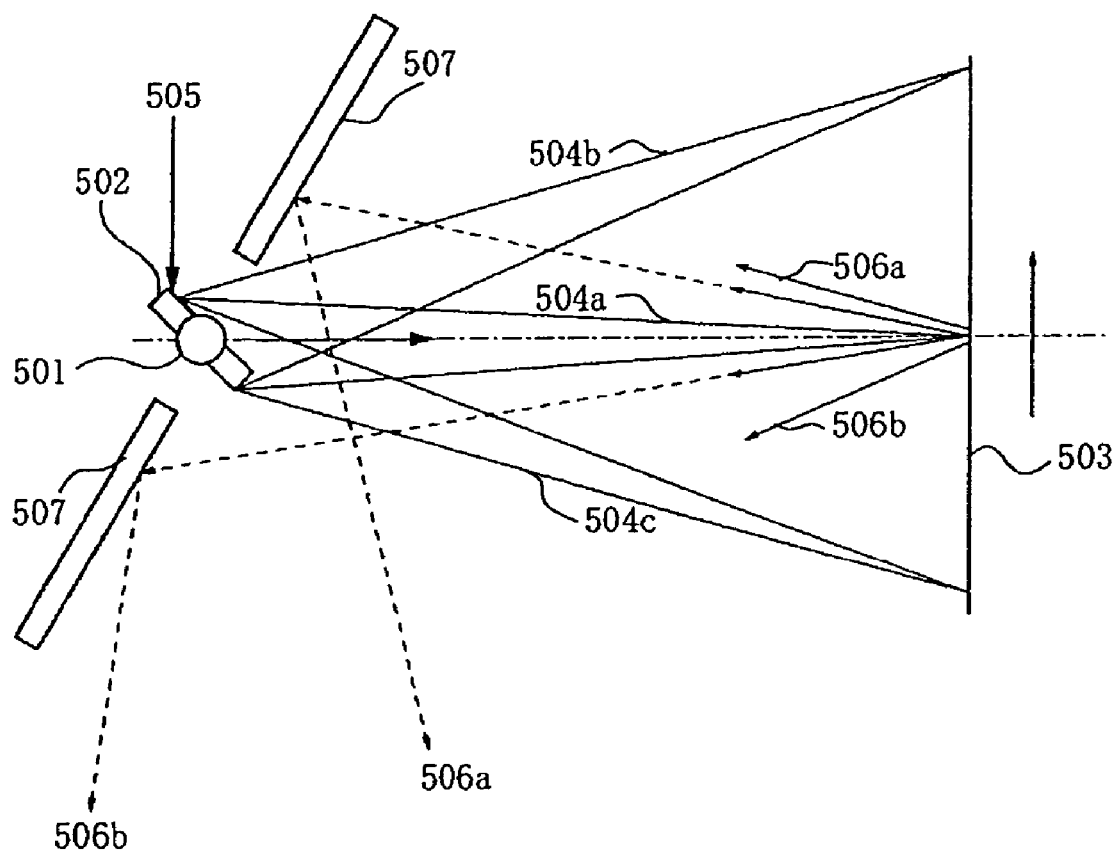
FIG. 1 is a structure view of a reflection-type scanning optical system.

In addition, as can be understood by a comparison between FIG. 1 and FIG. 2, by providing the scan surface 309 as a reflective surface, the optical paths can be folded, thus downsizing of an optical system can be achieved. Furthermore, by providing the scan surface 309 with diffusion characteristics, the diameter of beams which can be observed by an observer can be thickened. In addition, by, on the scan surface 309, forming a light source image by condensing the light flux from the light source 301, deterioration in image quality can be prevented even when the scan surface 309 is as a reflective diffusing surface.

Embodiment 1

Figure 4:
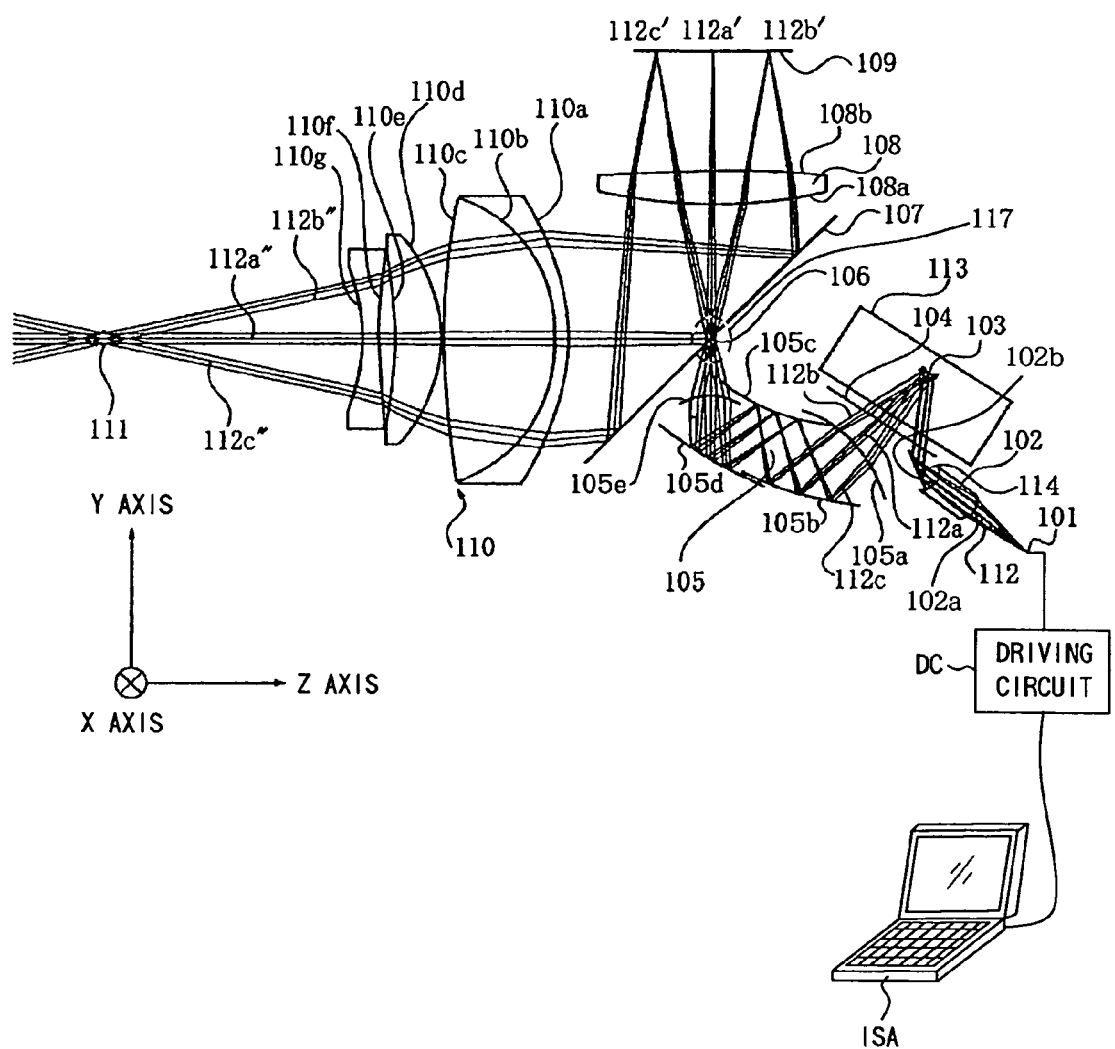
FIG. 4 is a schematic view showing a structure of an optical system according to Embodiment 1 of the present invention.

Embodiment 1 according to the present invention will be described by using FIG. 4. FIG. 4 shows a structure of an optical system for a scan-type image display apparatus of Embodiment 1.

In FIG. 4, a light source 101 is modulated by a driving circuit DC based on an input signal of an image to be displayed (an image signal from an image supply apparatus ISA including a personal computer, a DVD player, a video cassette recorder, a TV tuner, or an image-taking system of a video camera or a digital still camera). Here, although unillustrated, this is the same as in the following embodiments.

A light flux 112 emitted from the light source 101 proceeds to a scanning device 113 through a condenser optical system 102 having surfaces 102a and 102b and a reflective member 114. The scanning device 113 deflects and scans the light flux 112 at a deflection point 103. The scanning device 113 may be covered with a cover glass 104 or the like, and in this case, the light flux 112 is incident through the cover glass 104, is deflected at the deflection point 103, and emerges by passing through the cover glass 104 again. Examples of light fluxes deflected by the scanning device 113 are shown as light fluxes 112a, 112b and 112c. The light fluxes 112a to 112c deflected by the scanning device 113 are incident into a pupil image-forming optical system 105.

The pupil image-forming optical system 105 is composed of, in order from the side into which the light flux from the light source 101 is incident, an incident surface 105a, a reflective surface 105b, a reflective surface 105c, a reflective surface 105d, and an emergent surface 105e. The pupil image-forming optical system 105 is structured so as to form the deflection point 103 and a pupil conjugate point 106 outside the pupil image-forming optical system 105.

The surfaces 105a to 105e constituting the pupil image-forming optical system 105 may be rotationally asymmetric surfaces having no rotationally symmetric axes and may be surfaces decentered with respect to the light fluxes 112a to 112c.

The light fluxes 112a to 112c deflected by the scanning device 113 and emerged from the pupil image-forming optical system 105 pass through a transmissive region 117 provided on a part of a reflective member 107 and form light source images on a scan surface 109. In particular, by making the pupil conjugate point 106 substantially coincide with a position of the transmissive region 117 in the reflective member 107, it becomes possible to reduce the area of the transmissive region 117. The transmissive region 117 in the reflective member 107 may be formed by providing an opening in the reflective member 107, and may be formed by removing a partial reflective film on the reflective member 107 formed by applying a reflective film to a transparent base material.

112a', 112b', and 112c' show light source images formed on the scan surface 109. By synchronizing scanning characteristics of the scanning device 113 with a modulation of the light source 101, an image based on the image signal from the image supply apparatus ISA is displayed on the scan surface 109.

An optical system 108 and an optical system 110 constitute an ocular optical system for an observer's observation of the scan surface 109 (that is, an image formed by the scanned light flux).

Although the light fluxes 112a to 112c emerged from the pupil conjugate point 106 form light source images 112a', 112b' and 112c' on the scan surface 109, since the scan surface 109 is structured as a reflective surface having a diffusing action, the light fluxes 112a to 112c incident on the scan surface 109 again proceed toward the optical system 108 by being reflected by the scan surface 109, are reflected by the reflective surface 107, and are incident into a part of the ocular optical system 110. The observer can observe an image formed on the scan surface 109 by positioning the observer's eyeball in the vicinity of an exit pupil 111.

When forming these optical paths, the reflective surface 107 functions as a separating member to separate a scanning optical system which forms light source images on the scan surface 109 by scanning the light flux by means of the scanning device 113 and a display optical system which leads the images formed on the scan surface 109 to the exit pupil 111.

Figure 5:
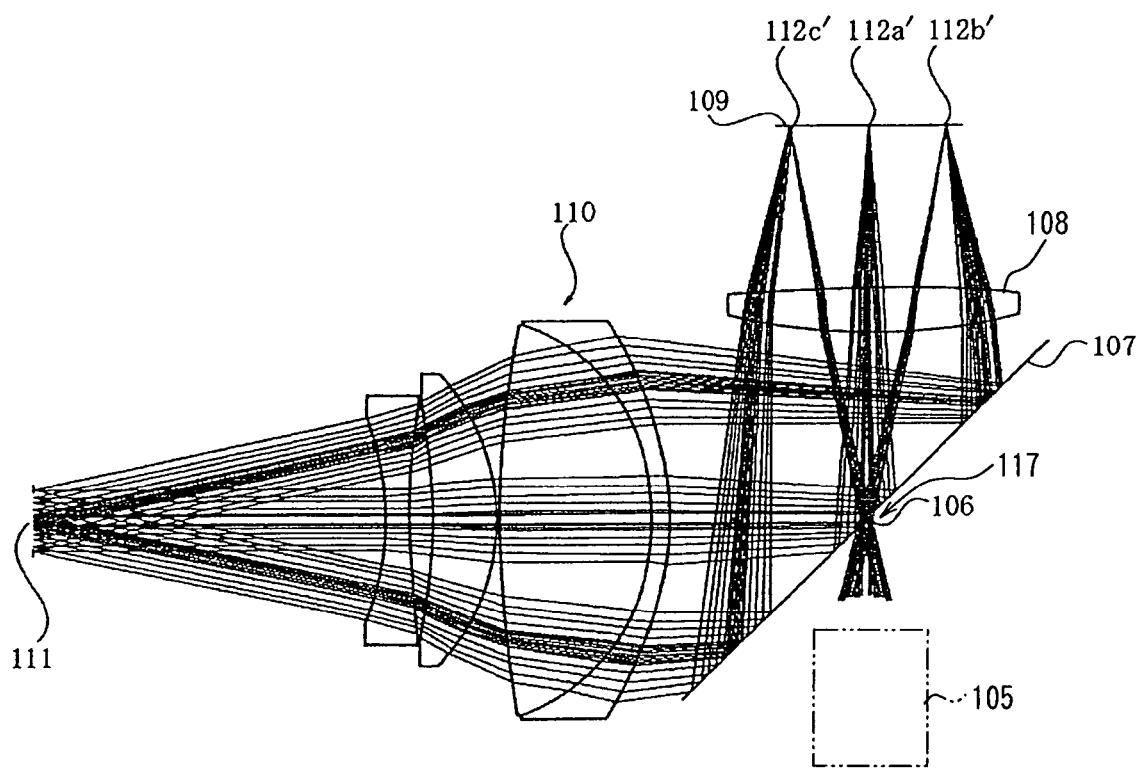
FIG. 5 is an explanatory view of a diffusion optical path in the optical system of Embodiment 1.

FIG. 5 is a view for explaining the diffused light flux on the scan surface 109. The light flux which have emerged from the pupil image-forming optical system 105 (unillustrated in FIG. 5) pass through the pupil conjugate position 106 positioned at the transmissive region 117 formed at a part of the reflective member 107 and is scanned on the scan surface 109. At the pupil conjugate position 106, the light flux is converged into a narrow light flux. Since the scan surface 109 has a diffusing action, the light flux reflected here increases in its divergent angle. Since the divergent angle of the light flux increases, the exit pupil 111 configured by the optical systems 108 and 110 is expanded.

In FIG. 5, since a part of the light flux vertically incident to form the light source image 112a' on the scan surface 109 passes through the transmissive region 117 on the reflective member 107 where the pupil conjugate point 106 is positioned after being reflected on the scan surface 109, the entire light flux does not proceed toward the exit pupil ill and a loss is produced. However, by setting the size of the transmissive region 117 on the reflective member 107 small, the loss can be reduced. In addition, since the reflective member 107 does not become an in-focus position when an observation is made through the exit pupil 111, this is hardly recognized by the observer.

In addition, the light flux from the light source 101 (not shown in FIG. 5) is incident on the scan surface 109 and is reflected in a direction to become distant from the optical axis at the time of the incidence. Therefore, an intermediate pupil image meaning the conjugate point 106 can be formed at a minute size on the reflective member 107. And, since the light flux from the light source 101 is transmitted through the minute intermediate pupil image, it is possible to reduce the size of the transmissive region 117 on the reflective member 107.

As in the present invention, by forming the pupil conjugate point 106 of the deflection point 103 (not shown in FIG. 5) of the scanning device 113 by the pupil image-forming optical system 105, the pupil conjugate point 106 equivalent to the deflection point 103 can be formed in the space. Thereby, the reflective region 117 on the reflective member 107 can be set small, and it becomes possible to hold the loss in the light amount to a minimum.

By structuring the scan surface 109 as a reflection type and structuring such that the light flux is transmitted through the optical system 108 twice, the optical path along which the observer observes the scan surface 109 through the exit pupil 111 (namely, optical path of the display optical system) and optical path to form an image on the scan surface 109 (namely, optical path of the scanning optical system) can be partially overlapped with each other, thus it becomes possible to form the optical system in a small size as a whole.

In addition, by disposing, like the optical system 110, an independently disposed optical system (optical elements) in only the observational optical path, it becomes possible to provide a diopter adjustment function to observe an image.

In the present embodiment, although, as the light source 101, a monochromatic light source may be used, it becomes possible to enable the observer to observe a color image by employing a structure using a light source which independently emits red, green and blue lights together with a color combining element and by independently controlling emission characteristics, such as emission intensities, etc., of the light source of the respective colors.

Figure 6:
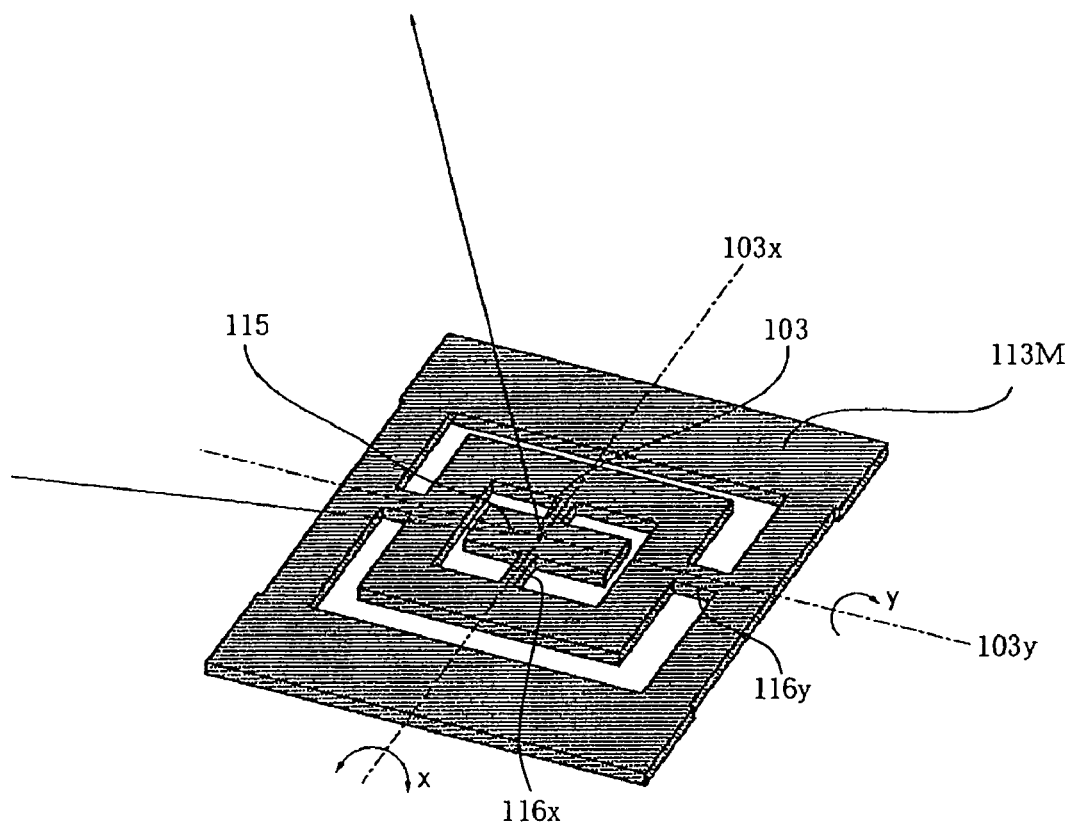
FIG. 6 is a schematic view showing an example of a scanning device.

Also, in the present embodiment, as the scanning device 113, a device of a structure as shown in FIG. 6 can be used. However, it is also possible to use other scanning devices.

FIG. 6 shows a scanning device 113 formed through semiconductor processes. Reference Numeral 113M denotes a base of the scanning device 113, a scanning surface 115 as a reflective surface having a deflection point 103 at approximately its center is supported by the base 113M via torsion bars 116$x$ and 116$y$. The scanning surface 115 performs a resonant reciprocating oscillating motion in the x-direction while using an axis 103$x$ as approximately its center due to a torsion of the torsion bar 116$x$. Also, the scanning surface 115 performs a reciprocating oscillating motion in the y-direction while using an axis 103$y$ as approximately its center due to a torsion of the torsion bar 116$y$. As an actuator to produce these two oscillating motions, although unillustrated, an actuator using an electromagnetic force, a electrostatic force, etc., can be used, for example.

As in the present embodiment, by disposing the pupil image-forming optical system 105 to form a conjugate image of the deflection point 103 in the space, it becomes possible to provide freedom for an actuator arrangement in the scanning device 113 and an arrangement of the cover glass, etc., without enlarging the transmissive region 117 on the reflective member 107.

Embodiment 2

Figure 7:
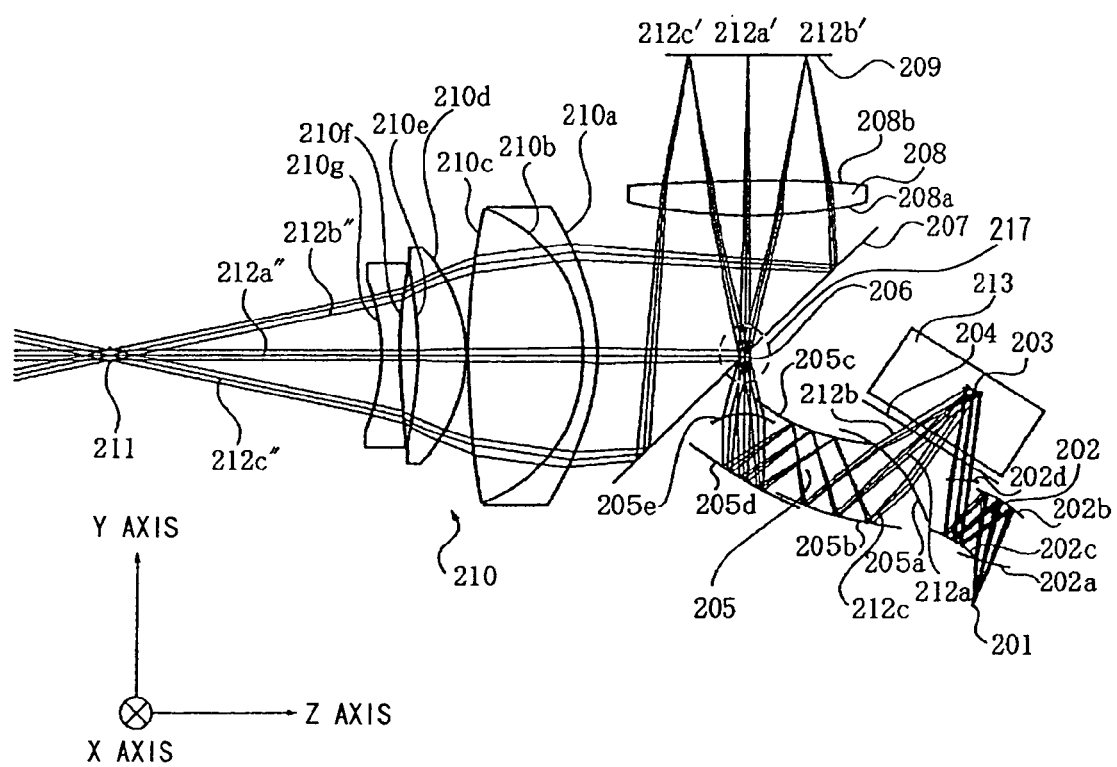
FIG. 7 is a schematic view showing a structure of an optical system according to Embodiment 2 of the present invention.

Embodiment 2 according to the present invention will be described by using FIG. 7. FIG. 7 shows a structure of an optical system for a scan-type image display apparatus of Embodiment 2.

In FIG. 7, a light source 201 is modulated by a driving circuit (see FIG. 4) based on an input signal of an image to be displayed (an image signal). A light flux 212 emitted from the light source 201 proceeds to a scanning device 213 through a condenser optical system 202. The condenser optical system 202 is composed of an incident surface 202$a$, reflective surfaces 202$b$ and 202$c$ and an emergent surface 202$d$. The light flux 212 emerged from the condenser optical system 202 proceeds to the scanning device 213.

The scanning device 213 deflects the incident light flux 212 at the deflecting point 203. On the scanning device 213, a cover glass 204 is provided, and the light flux 212 incident through the cover glass 204 is deflected at the deflection point 203 and emerges by passing through the cover glass 204 again. Examples of light fluxes deflected by the scanning device 213 are shown as light fluxes 212$a$, 212$b$ and 212$c$. The light fluxes 212$a$ to 212$c$ deflected by the scanning device 213 are incident into a pupil image-forming optical system 205. The pupil image-forming optical system 205 is composed of, in order from the side into which the light flux from the light sources 201 is incident, an incident surface 205$a$, a reflective surface 205$b$, a reflective surface 205$c$, a reflective surface 205$d$ and an emergent surface 205$e$, and is structured so as to form the deflection point 203 and a pupil conjugate point 206 outside the pupil image-forming optical system 205. The surfaces 205$a$ to 205$e$ constituting the pupil image-forming optical system 205 are desirably composed of rotationally asymmetric surfaces having no rotationally symmetric axes and reflective surfaces decentered with respect to the light flux.

The light fluxes 212$a$ to 212$c$ deflected by the scanning device 213 and emerged from the pupil image-forming optical system 205 pass through a transmissive region 217, which is a part of a reflective member 207 and at which the pupil conjugate point 206 is substantially positioned, and form light source images on a scan surface 209 through an optical system 208. 212$a'$, 212$b'$ and 212$c'$ show light source images formed on the scan surface 209. By synchronizing scanning characteristics of the scanning device 213 with a modulation of the light source 201, an image based on the image signal is displayed on the scan surface 209.

An optical system 208 and an optical system 210 constitute an ocular optical system for an observer's observation of the scan surface 209.

Although the light fluxes 212$a$ to 212$c$ emerged from the pupil conjugate point 206 form light source images 212$a'$, 212$b'$ and 212$c'$ on the scan surface 209, since the scan surface 209 is structured as a reflective surface having a diffusing action, the light fluxes 212$a$ to 212$c$ incident herein again proceed toward the optical system 208 by being reflected by the scan surface 209, are reflected by the reflective surface 207, and are incident into a part of the ocular optical system 210. The observer can observe an image formed on the scan surface 209 by positioning his/her eyeball in the vicinity of an exit pupil 211.

The structure of the following part is the same as that of Embodiment 1 and description thereof is therefore omitted.

Similar to Embodiment 1, in the present embodiment as well, since a part of the light flux vertically incident to form the light source image 212$a'$ on the scan surface 209 passes through the transmissive region 217 on the reflective member 207 where the pupil conjugate point 206 is positioned after being reflected on the scan surface 209, the entire light flux does not proceed toward the exit pupil 211 and a loss of light is produced. However, by setting the size of the transmissive region 217 on the reflective member 207 small, the loss can be reduced.

As in the present embodiment, by forming the pupil conjugate point 206 of the deflection point 203 of the scanning device 213 by the pupil image-forming optical system 205, the pupil conjugate point 206 equivalent to the deflection point 203 can be formed in a space. Thereby, the transmissive region 217 on the reflective member 207 can be set small, and it becomes possible to hold the loss in the light amount to a minimum.

By structuring the scan surface 209 as a reflective and structuring such that the light flux is transmitted through the optical system 208 twice, the optical path along which the observer observes the scan surface 209 through the exit pupil 211 and optical path to form an image on the scan surface 209 can be partially overlapped with each other. Thus, it becomes possible to form the optical system in a small size as a whole.

In addition, by disposing, such as the optical system 210, an independently disposed optical system (optical elements) in only the observational optical path, it becomes possible to provide a diopter adjustment function to observe an image.

In the present embodiment, although, as the light source 201, a monochromatic light source may be used, it becomes possible to enable the observer to observe a color image by employing a structure using a light source which independently emits red, green, and blue lights together with a color combining element and by independently controlling emission characteristics, such as emission intensities, etc., of the light source of the respective colors.

Embodiment 3

Figure 8:
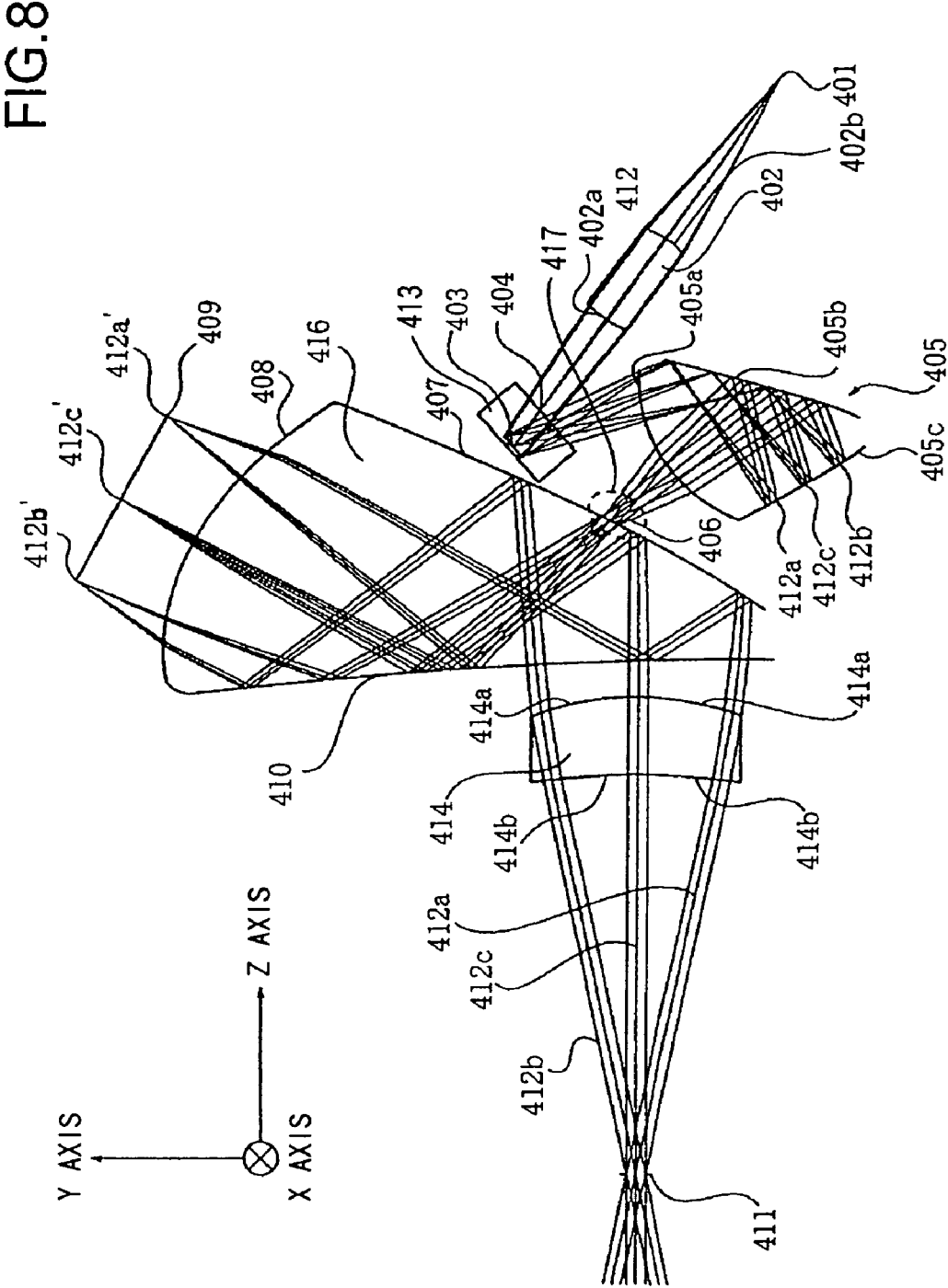
FIG. 8 is a schematic view showing a structure of an optical system according to Embodiment 3 of the present invention.

Embodiment 3 according to the present invention will be described by use of FIG. 8. FIG. 8 shows a structure of an optical system of a scan-type image display apparatus of Embodiment 3.

In FIG. 8, a light source 401 is modulated by a driving circuit (see FIG. 4) based on an input signal of an image to be displayed (an image signal). A light flux 412 emitted from the light source 401 proceeds to a scanning device 413 through a condenser optical system 402 having surfaces 402a and 402b. The scanning device 413 deflects the incident light at the deflecting point 403. Examples of light fluxes deflected by the scanning device 413 are shown as light fluxes 412a, 412b and 412c. The light fluxes 412a to 412c deflected by the scanning device 413 are incident into a pupil image-forming optical system 405. The pupil image-forming optical system 405 is composed of, in order from the side into which the light flux from the light sources 401 is incident, an incident surface 405a, a reflective surface 405b, a reflective surface 405c and an emergent surface 405e, and is structured so as to form the deflection point 403 and a pupil conjugate point 406 outside the pupil image-forming optical system 405.

The surfaces 405a to 405e constituting the pupil image-forming optical system 405 are composed of rotationally asymmetric surfaces having no rotationally symmetric axes.

The light fluxes 412a to 412c deflected by the scanning device 413 and emerged from the pupil image-forming optical system 405 are transmitted through a transmissive region 417, which is a part of a reflective surface 407 and at which the pupil conjugate point 406 is substantially positioned, and are incident into a optical system 416. The light fluxes 412a to 412c incident into the optical system 416 are reflected by a surface 410, are furthermore transmitted through a transmissive surface 408, and proceed to a scan surface 409. On the scan surface 409, for example, light source images 412a', 412b' and 412c' are formed according to a scanning angle. By synchronizing scanning characteristics of the scanning device 413 with a modulation of the light source 401, an image based on the image signal is displayed on the scan surface 409.

An optical system 414 and the optical system 416 constitutes an ocular optical system for an observer's observation of the scan surface 409 (that is, an image formed by the scanned light flux).

The light fluxes 412a to 412c emerged from the pupil conjugate point 406 form light source images 412a', 412b' and 412c' on the scan surface 409. Since the scan surface 409 is structured as a reflective surface having a diffusing action, the light fluxes 412a to 412c incident herein again proceed toward the optical system 408 by being reflected by the scan surface 409, reflected and deflected by the surface 410, and proceed to the reflective surface 407. The reflective surface 407 is, except for the transmissive region 417, structured as a reflective surface, and the light fluxes 412a to 412c reflected by the surface 410 are mostly reflected by the reflective surface 407, and again proceed to the surface 410. At the surface 410, the light fluxes 412a to 412c are now transmitted and emerge from the optical system 416 to proceed to the optical system 414.

The observer can observe an image formed on the scan surface 409 by positioning the observer's eyeball in the vicinity of an exit pupil 411. In the present embodiment, although the scan surface 409 is disposed outside the optical system 416, the scan surface 409 may be formed on the transmissive surface 408.

Figure 9:
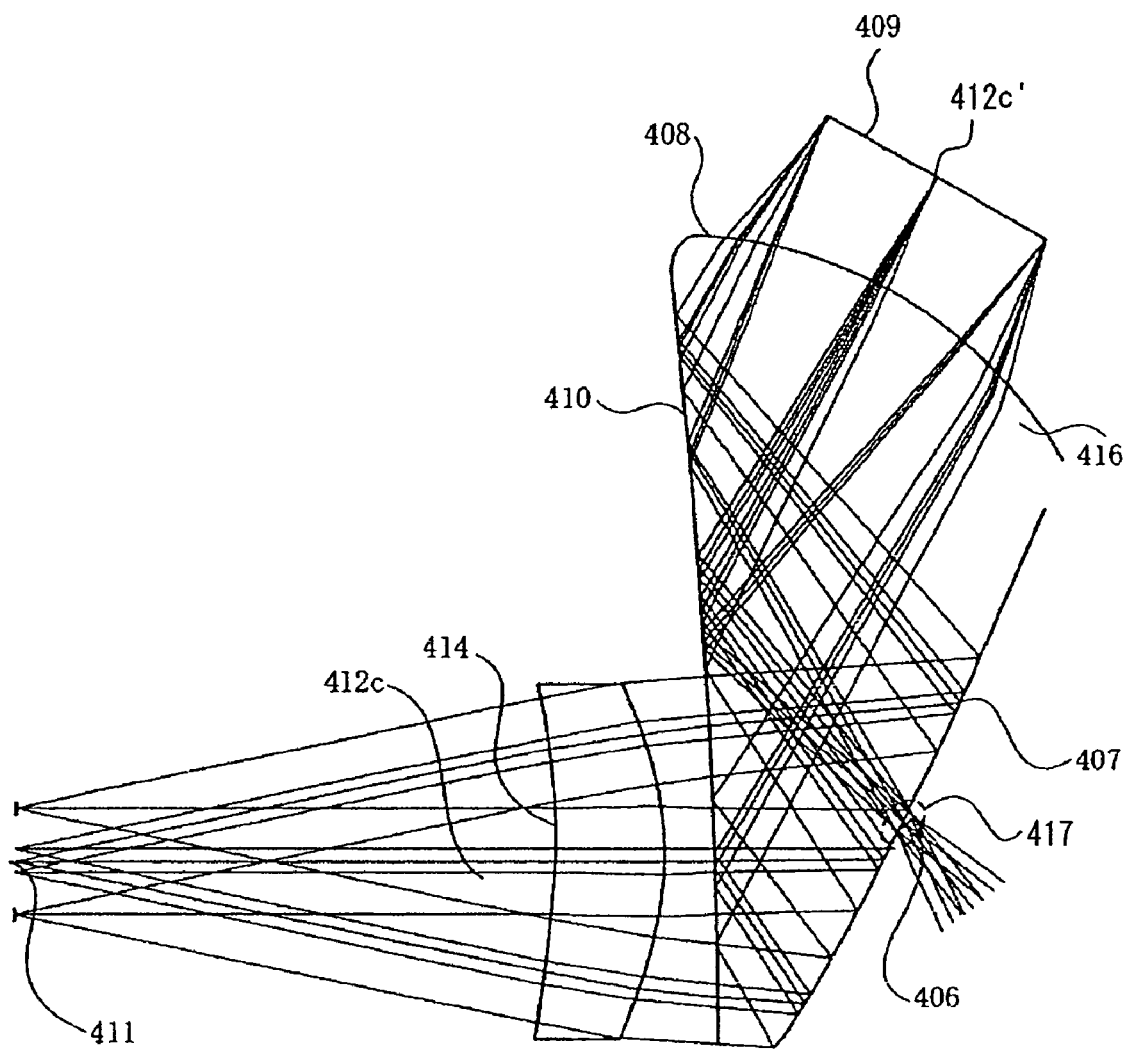
FIG. 9 is an explanatory view of a diffusion optical path in the optical system of Embodiment 3.

FIG. 9 is a view for explaining the diffused light flux on the scan surface 409. The light flux emerged from the pupil image-forming optical system 405 (unillustrated in FIG. 9) scans the scan surface 409 from the pupil conjugate point 406 disposed at a position substantially coincide with the transmissive region 417 formed at a part of the reflective surface 407. By making the transmissive region 417 coincide with the pupil conjugate point 406, the light flux to be incident through the transmissive region 417 is made into narrow light fluxes, so that the area of the transmissive region 417 is minimized. Since the scan surface 409 has a diffusing action, the reflected light flux increases in its divergent angle. Since the divergent angle of the light flux increases, the exit pupil 411 is expanded.

In FIG. 9, since a part of the light flux vertically incident to form the light source image 412c' on the scan surface 409 passes through the transmissive region 417 on the reflective surface 407 where the pupil conjugate point 406 is positioned after being reflected on the scan surface 409, the entire light flux does not proceed toward the exit pupil 411 and a loss of light is produced. However, by setting the size of the transmissive region 417 on the reflective surface 407 small, the loss can be reduced.

As in the present embodiment, by forming the pupil conjugate point 406 of the deflection point 403 of the scanning device 413 by the pupil image-forming optical system 405, the pupil conjugate point 406 equivalent to the deflection point 403 can be formed in a space. Thereby, the transmissive region 417 on the reflective surface 407 can be set small, and it becomes possible to hold the loss in the light amount to a minimum.

By structuring the scan surface 409 as a reflection type and structuring such that the light flux is reflected on the optical surface 410 twice, the optical path along which the observer observes the scan surface 409 through the exit pupil 411 and optical path to form an image on the scan surface 409 can be partially overlapped with each other, thus, it becomes possible to form the optical system in a small size as a whole.

In the optical system 416, the light flux incident through the transmissive region 417 proceeds in order of the surface 410 (reflection), surface 408 (transmission), surface 409 (reflection), surface 408 (retransmission) and surface 410 (re-reflection). That is, with a reflection on the surface 409 as a boundary, a to-and-fro optical path which is constituted of a forward path (surfaces 410–409) and a return path (surfaces 409–410) in an opposite direction to the forward path is formed. The surface 409 which is the boundary is referred to as a returning reflective surface. Namely, in before and after being performed a reflection on the surface 409, for example, with respect to a surface normal at a hit point of the light flux (a ray) on the surface 410 in the forward path, the light flux (the ray), in the return path, is reflected and proceeds to the substantially opposite side to a reflecting side in the previous reflection on the surface 410 in the forward path. Thereby, a returning optical path is formed.

As such, by forming a returning optical path between a plurality of decentered reflective surfaces and approximately overlapping its forward path and return path, an optical path with a long length can be contained in the small-sized optical system 416. As a consequence, the overall display optical system is also downsized. In addition, since the number of times of available reflections can be increased, it becomes possible to weaken an optical action provided by a one-time reflection, therefore, occurrence of various aberrations can be suppressed.

When focusing on such reflections on a surface before and after the returning reflection, for example, on the surface 410, the directions of outer products each formed by a vector indicating an incident direction onto the surface 410 and a vector indicating a reflection direction therefrom of a light flux in the forward path and the return path are substantially opposite. By utilizing a reflection on the returning reflective surface characterized as such, compared to so-called zigzag reflections between two ordinary surfaces facing each other, it becomes possible to contain a long optical path in a narrow space while occurrence of distortion is suppressed.

In addition, although the present embodiment shows a case where two reflections on the same surface (surface 410) are performed, the present invention is not limited hereto, and three or more reflections may be performed on a predetermined surface by performing a plurality of returning reflections to utilize an optical power of the predetermined surface. In addition, a plurality of reflective surfaces to perform such a returning reflection may be provided.

In addition, although FIG. 9 shows a case where the incident light on the returning reflective surface and the reflected light therefrom exist within the paper plane of the drawing, such a setting is not always necessary. Namely, a component in a direction perpendicular to the paper plane of the drawing may be provided by the returning reflective surface for a light flux to be reflected thereon.

In this case, for example, when focusing on a reflection on the surface 410, the directions of outer products each formed by a vector indicating an incident direction onto the surface 410 and a vector indicating a reflection direction therefrom in the forward path and the return path form an obtuse angle. In addition, the structure of the optical path is also characterized in that an inner product formed between these outer products becomes negative. Furthermore, a component in a direction perpendicular to the paper plane of the drawing may be provided for the light flux to be reflected not only on the returning reflective surface but also on another reflective surface. Thereby, the respective reflective surfaces are also provided with a decentration in the perpendicular direction to the paper plane of the drawing for the light flux, thus the degree of freedom of an optical design can be improved.

Furthermore, by providing the respective reflective surfaces forming a folded optical path as decentered reflective surfaces, it becomes possible to fold the optical path within a low-profile optical element, thus a long optical path length can be secured within a further small-sized and low-profile optical system.

Here, in the present embodiment, since a structure is employed such that, on the scan surface 409, the scanned light flux is condensed to form a conjugate image with the light source, deterioration in an image observed through the display optical system is small.

In addition, by disposing, like the optical system 414, an independently disposed optical system (optical element) in only the observational optical path, it becomes possible to provide a diopter adjustment function to observe an image.

In the present embodiment, although, as the light source 401 in FIG. 8, a monochromatic light source may be used, it becomes possible to enable the observer to observe a color image by employing a structure using a light source which independently emits red, green, and blue lights together with a color combining element and by independently controlling emission characteristics, such as emission intensities, etc., of the light source of the respective colors.

NUMERICAL EXAMPLES

Hereinafter, numerical examples corresponding to Embodiments 1 to 3 will be described.

Although, in the description of the embodiments, a description has been given of the optical paths in order from a light source side, description will be given in the numerical examples in a manner reversely tracing a light flux from an exit pupil side where an observer's eyeball is positioned.

The respective numerical examples are described in Table 1 to Table 3. Herein, the center of the exit pupil is mentioned as a reference (origin) of an absolute coordinate system.

Three-dimensional coordinate axes of the absolute coordinate system are provided as a Z-axis, a Y-axis, and an X-axis, and these are respectively defined as follows.

Z-axis: A straight line which passes through the center of a first surface (absolute coordinate origin) from the center of a 0th surface (which is an exit pupil surface when being viewed from the light source side). Since the present embodiment employs reverse tracing, the 0th surface is a surface equivalent to an entrance pupil, and this direction is provided as positive.

Y-axis: A straight line which passes through the origin and creates a right angle counterclockwise with respect to the Z-axis.

X-axis: A straight line which passes through the origin and perpendicular to the Z-axis and Y-axis.

In addition, in a notation of a surface shape of an i-th surface (the exit pupil surface is provided as the first surface, and thereafter, a surface i-th from the exit pupil side is provided as an i-th surface) of the optical system, this is, by setting a local coordinate system, expressed by using a function based on the local coordinate system. A tilt angle of the i-th surface in the YZ plane is, with respect to the Z-axis of the absolute optical system, expressed by an angle $\theta g_i$ (the unit is degree) regarding a counterclockwise direction as positive. In the respective examples, the tilt angle is set in only the YZ plane. The y and z axes of the local coordinate system for the i-th surface exist in the YZ plane of the absolute coordinate system and are tilted, in the YZ plane, by the angle $\theta g_i$. The respective coordinate axes of the local coordinate system are defined as follows.

z-axis: A straight line which passes through the local coordinate origin and creates, in the YZ plane, $\theta i$ counterclockwise with respect to the Z-axis of the absolute coordinate system.

y-axis: A straight line which passes through the local coordinate origin and creates, in the YZ plane, a right angle counterclockwise with respect to the z-axis direction.

x-axis: A straight line which passes through the local coordinate origin and is perpendicular to the YZ plane.

ndi and vdi represent a refractive index and Abbe's number for the d-line between the i-th surface and i+1-th surface, respectively.

In addition, a surface shape having no rotationally symmetric axes is expressed by the following numerical expression. This is, in the numerical examples, mentioned as a rotationally asymmetric surface (XYP or SPS in the tables.)

$$z = \frac{cr^2}{1 + \sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$
$$c15y^4 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 + c28y^6$$

This function is a function to define a surface shape by local coordinates (x, y, z) of the i-th surface. Herein, coefficients (Cij) of the respective terms are coefficients of terms for x and y, which are listed in the following tables. In addition, in the first term, c represents a curvature of a base surface, r represents a radius shown by $r^2 = x^2 + y^2$, and k represents the above-described coefficient. A surface shape is expressed by the respective coefficients as in the above.

In addition, by providing the terms concerning odd-orders of x as zero, a surface symmetrical to the yz plane can be obtained.

In addition, in the present embodiment, a rotationally symmetric aspheric surface having rotational symmetry is used for some surfaces, and a function thereof is expressed as follows.

$$z = \frac{(h^2)/R_i}{1 + \{1-(1+k)h^2/Ri^2\}^{1/2}} + Ah^2 + Bh^4 + Ch^6 + Dh^8 + Eh^{10} + \ldots$$

Herein, $$h^2 = x^2 + y^2$$

In addition, Ri represents a radius of curvature. A, B, C, D, are E, etc., are coefficients for h, and a surface shape is defined thereby. This rotationally symmetric aspheric surface is also defined by each local coordinate system.

In Tables 1 to 3 of the numerical examples, local radius of curvatures (a radius of curvature on a local generatrix section and a radius of curvature on a local directrix section) rx and ry at a hit point of a central principal ray, which is a ray passing through the center of an image formed on the scan surface and the center of exit pupil, on each optical surface, a local surface distance d of a distance (a distance on the central principal ray, a value without an air conversion) between two hit points on the i-th surface and the i+1-th surface, a decentering amount "shift" and "tilt", a refractive index nd and an Abbe's number vd are shown.

A surface whose shape is a free-curved surface is shown as XYP, and a spherical surface is shown as SPH, and an aspherical surface is shown as ASP, and the respective coefficients are shown in the lower sections of the tables. A notation of M represents that the surface is a reflective surface. Furthermore, "e–z" means "×10$^{-z}$".

The following numerical examples 1 to 3 correspond to Embodiments 1 to 3, respectively.

Numerical Example 1

In the embodiment shown in FIG. 4, the horizontal angle of view of an image observed by an observer is ±12 degrees (in the paper plane of the drawing), and the vertical angle of view thereof is ±9 degrees (perpendicular to the paper plane). The scanning surface (deflection point) of the scanning device is the 38$^{th}$ surface (equivalent to 103 in Embodiment 1), and the horizontal deflection angle of the scanning surface is ±6.2 degrees, the horizontal deflection angle thereof is ±7.2 degrees. The diameter of the entrance pupil is 1.0 mm.

Correspondence between the symbols in FIG. 4 and surface numbers (sur) in Table 1 is as follows. Other surfaces are optically ineffective surfaces, and dummy surfaces are also described.

| | |
|---|---|
| Pupil 111 | Surface number 1 |
| Surface 110g | Surface number 3 |
| Surface 110f | Surface number 4 |
| Surface 110e | Surface number 5 |
| Surface 110d | Surface number 6 |
| Surface 110c | Surface number 7 |
| Surface 110b | Surface number 8 |
| Surface 110a | Surface number 9 |
| Reflective surface 107 | Surface number 11 |
| Surface 108a | Surface number 14, 21 |
| Surface 108b | Surface number 15, 20 |
| Surface 109 | Surface number 17 |
| Surface 105e | Surface number 25 |
| Surface 105d | Surface number 26 |
| Surface 105c | Surface number 27 |
| Surface 105b | Surface number 28 |
| Surface 105a | Surface number 29 |
| Surface 104a | Surface number 31, 43 |
| Surface 104b | Surface number 32, 42 |
| Surface 102b | Surface number 49 |
| Surface 102a | Surface number 50 |
| Light source 101 | Surface number 52 |

TABLE 1

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 0.000 | 0.000 | 0.000 | 1.000 | |
| | 2 | 0.0000 | 0.0000 | 0.0000 | 0.0000 | 0.0000 | 22.824 | 0.000 | 0.000 | 1.000 | |
| | 3 | 0.0000 | 22.8245 | 0.0000 | −17.8846 | −17.8846 | 1.500 | 0.000 | 0.000 | 1.847 | 23.78 |
| | 4 | 0.0000 | 24.3245 | 0.0000 | 52.1951 | 52.1951 | 1.524 | 0.000 | 0.000 | 1.000 | |
| | 5 | 0.0000 | 25.8486 | 0.0000 | −39.1743 | −39.1743 | 4.000 | 0.000 | 0.000 | 1.603 | 60.64 |

TABLE 1-continued

|     |    |          |          |          |           |           |        |         |         |        |       |
|-----|----|----------|----------|----------|-----------|-----------|--------|---------|---------|--------|-------|
|     | 6  | 0.0000   | 29.8486  | 0.0000   | −13.7497  | −13.7497  | 0.200  | 0.000   | 0.000   | 1.000  |       |
|     | 7  | 0.0000   | 30.0486  | 0.0000   | 64.2255   | 64.2255   | 9.703  | 0.000   | 0.000   | 1.694  | 53.20 |
|     | 8  | 0.0000   | 39.7513  | 0.0000   | −13.6685  | −13.6685  | 1.200  | 0.000   | 0.000   | 1.720  | 50.22 |
|     | 9  | 0.0000   | 40.9513  | 0.0000   | −21.9853  | −21.9853  | 12.500 | 0.000   | 0.000   | 1.000  |       |
|     | 10 | 0.0000   | 53.4513  | 0.0000   | 0.0000    | 0.0000    | 0.000  | 0.000   | 0.000   | 1.000  |       |
| M   | 11 | 0.0000   | 53.45129 | −45.0000 | 0.0000    | 0.0000    | 0.000  | 0.000   | −45.000 | −1.000 |       |
|     | 12 | 0.0000   | 53.4513  | −90.0000 | 0.0000    | 0.0000    | 0.000  | 0.000   | −90.000 | −1.000 |       |
|     | 13 | 12.0000  | 53.4513  | −90.0000 | 0.0000    | 0.0000    | 0.000  | 12.000  | −90.000 | −1.000 |       |
|     | 14 | 12.0000  | 53.4513  | −90.0000 | −42.5959  | −42.5959  | 0.000  | 12.000  | −90.000 | −1.487 | 70.24 |
|     | 15 | 15.0000  | 53.4513  | −90.0000 | 132.0350  | 132.0350  | 0.000  | 15.000  | −90.000 | −1.000 |       |
|     | 16 | 25.7150  | 53.4513  | −90.0000 | 0.0000    | 0.0000    | 0.000  | 25.715  | −90.000 | −1.000 |       |
| M   | 17 | 25.7150  | 53.45129 | −90.0000 | 0.0000    | 0.0000    | 0.000  | 25.715  | −90.000 | 1.000  |       |
|     | 18 | 25.7150  | 53.4513  | −90.0000 | 0.0000    | 0.0000    | 0.000  | 25.715  | −90.000 | 1.000  |       |
|     | 19 | 15.0000  | 53.4513  | −90.0000 | 0.0000    | 0.0000    | 0.000  | 15.000  | −90.000 | 1.000  |       |
|     | 20 | 15.0000  | 53.4513  | −90.0000 | 132.0350  | 132.0350  | 0.000  | 15.000  | −90.000 | 1.487  | 70.24 |
|     | 21 | 12.0000  | 53.4513  | −90.0000 | −42.5959  | −42.5959  | 0.000  | 12.000  | −90.000 | 1.000  |       |
|     | 22 | 12.0000  | 53.4513  | −90.0000 | 0.0000    | 0.0000    | 0.000  | 12.000  | −90.000 | 1.000  |       |
|     | 23 | 0.0000   | 53.4513  | −90.0000 | 0.0000    | 0.0000    | 0.000  | 0.000   | −90.000 | 1.000  |       |
|     | 24 | −5.0000  | 53.4513  | −90.0000 | 0.0000    | 0.0000    | 0.000  | −5.000  | −90.000 | 1.000  |       |
| XYP | 25 | −5.0000  | 53.4513  | −90.0000 | −4.7759   | −4.7759   | 0.000  | −5.000  | −90.000 | 1.516  | 64.14 |
| XYP-M | 26 | 10.5000  | 53.4513  | −62.5679 | 30.1313   | 30.1313   | 5.725  | −10.500 | −62.568 | −1.516 | 64.14 |
| XYP-M | 27 | −6.4714  | 59.1758  | −70.8916 | −15.2213  | −15.2213  | 2.149  | −6.471  | −70.892 | 1.516  | 64.14 |
| XYP-M | 28 | −13.6570 | 61.3244  | −74.7632 | −19.9533  | −19.9533  | 4.763  | −13.657 | −74.763 | −1.516 | 64.14 |
| XYP | 29 | −9.2341  | 66.08757 | −42.8790 | −7.0697   | −7.0697   | 6.595  | −9.234  | −42.879 | −1.000 |       |
|     | 30 | −3.1100  | 72.6827  | −42.8790 | 0.0000    | 0.0000    | −4.397 | −3.110  | −42.879 | −1.000 |       |
|     | 31 | −7.1927  | 68.2859  | −57.8790 | 0.0000    | 0.0000    | 0.733  | −7.193  | −57.879 | −1.516 | 64.14 |
|     | 32 | −6.5123  | 69.0187  | −57.8790 | 0.0000    | 0.0000    | 3.664  | −6.512  | −57.879 | −1.000 |       |
|     | 33 | −3.1100  | 72.6827  | −42.8790 | 0.0000    | 0.0000    | 0.000  | −3.110  | −42.879 | −1.000 |       |
|     | 34 | −3.1100  | 72.6827  | −42.8790 | 0.0000    | 0.0000    | 0.000  | −3.110  | −42.879 | −1.000 |       |
|     | 35 | −3.1100  | 72.6827  | −62.8790 | 0.0000    | 0.0000    | 0.000  | −3.110  | −62.879 | −1.000 |       |
|     | 36 | −3.1100  | 72.6827  | −62.8790 | 0.0000    | 0.0000    | 0.000  | −3.110  | −62.879 | −1.000 |       |
|     | 37 | −3.1100  | 72.6827  | −62.8790 | 0.0000    | 0.0000    | 0.000  | −3.110  | −62.879 | −1.000 |       |
| M   | 38 | −3.1100  | 72.6827  | −62.8790 | 0.0000    | 0.0000    | 0.000  | −3.110  | −62.879 | 1.000  |       |
|     | 39 | −3.1100  | 72.6827  | −42.8790 | 0.0000    | 0.0000    | 0.000  | −3.110  | −42.879 | 1.000  |       |
|     | 40 | −3.1100  | 72.6827  | −82.8790 | 0.0000    | 0.0000    | 0.000  | −3.110  | −82.879 | 1.000  |       |
|     | 41 | −3.1100  | 72.6827  | −82.8790 | 0.0000    | 0.0000    | −4.397 | −3.110  | −82.879 | 1.000  |       |
|     | 42 | −7.1927  | 68.2859  | −57.8790 | 0.0000    | 0.0000    | 0.000  | −7.193  | −57.879 | 1.516  | 64.14 |
|     | 43 | −7.1927  | 68.2859  | −57.8790 | 0.0000    | 0.0000    | 4.397  | −7.193  | −57.879 | 1.000  |       |
|     | 44 | −3.1100  | 72.6825  | −82.8790 | 0.0000    | 0.0000    | 0.000  | −3.110  | −82.879 | 1.000  |       |
|     | 45 | −3.1100  | 72.6825  | −82.8790 | 0.0000    | 0.0000    | 0.000  | −3.110  | −82.879 | 1.000  |       |
|     | 46 | −3.1100  | 72.6825  | −82.8790 | 0.0000    | 0.0000    | −0.930 | −3.110  | −82.879 | 1.000  |       |
|     | 47 | −10.5521 | 71.7528  | −82.8790 | 0.0000    | 0.0000    | −0.124 | −10.552 | −82.879 | 1.000  |       |
| M   | 48 | −11.5444 | 71.62880 | −22.8790 | 0.0000    | 0.0000    | 1.595  | −11.544 | −22.879 | 1.000  |       |
| ASP | 49 | −12.7514 | 73.2235  | 37.1210  | −346.6615 | −346.6615 | 3.189  | −12.751 | 37.121  | −1.516 | 64.14 |
| ASP | 50 | −15.1654 | 76.41298 | 37.1210  | 2.9667    | 2.0811    | 0.000  | −15.165 | 37.121  | −1.000 |       |
|     | 51 | −15.1654 | 76.4130  | 37.1210  | 0.0000    | 0.0000    | 5.171  | −15.165 | 37.121  | −1.000 |       |
|     | 52 | −19.0793 | 81.5841  | 37.1210  | 0.0000    | 0.0000    | 0.000  | −19.079 | 37.121  | −1.000 |       | surface no. = 3

SPH  rdy = −1.788e+001 surface no. = 4

SPH  rdy = 5.220e+001 surface no. = 5

SPH  rdy = −3.917e+001 surface no. = 6

SPH  rdy = −1.375e+001 surface no. = 7

SPH  rdy = 6.423e+001 surface no. = 8

SPH  rdy = −1.367e+001 surface no. = 9

SPH  rdy = −2.199e+001 surface no. = 14

SPH  rdy = −4.260e+001 surface no. = 15

SPH  rdy = 1.320e+002

TABLE 1-continued surface no. = 25

XYP  rdy = −4.776e+000 c4 = 0.000e+000 c6 = 0.000e+000 c8 = 2.264e−001 c10 = 3.301e−003
c11 = −5.453e−003 c13 = 0.000e+000 c17 = 4.828e−003 c19 = 0.000e+000 c21 = −1.199e−004
c22 = 5.894e−004 c24 = −6.269e−004 c26 = −1.954e−005 c28 = 5.275e−006 surface no. = 26

XYP  rdy 3.013e+001 c4 = 0.000e+000 c6 = 0.000e+000 c8 = −2.162e−002 c10 = 8.885e−004
c11 = 5.259e−005 c13 = 0.000e+000 c17 = 1.482e−003 c19 = 0.000e+000 c21 = 2.660e−005
c22 = −1.466e−004 c24 = −3.377e−005 c26 = −5.081e−005 c28 = −2.613e−006 surface no. = 27

XYP  rdy = −1.522e+001 c4 = 0.000e+000 c6 = 0.000e+000 c8 = 1.975e−002 c10 = 2.090e−003
c11 = −5.213e−003 c13 = 0.000e+000 c17 = −1.009e−002 c19 = 0.000e+000 c21 = −3.700e−005
c22 = 4.601e−004 c24 = 3.506e−004 c26 = −5.779e−005 c28 = −1.810e−005 surface no. = 28

XYP  rdy = −1.995e+001 c4 = 0.000e+000 c6 = 0.000e+000 c8 = 9.331e−003 c10 = 5.004e−004
c11 = −3.706e−005 c13 = 0.000e+000 c17 = −1.879e−004 c19 = 0.000e+000 c21 = 1.004e−006
c22 = −4.201e−007 c24 = 2.253e−007 c26 = −1.459e−006 c28 = 5.123e−007 surface no. = 29

XYP  rdy = −7.070e+000 c4 = 0.000e+000 c6 = 0.000e+000 c8 = 1.324e−001 c10 = 1.332e−003
c11 = −3.279e−004 c13 = 0.000e+000 c17 = −1.010e−003 c19 = 0.000e+000 c21 = −4.932e−005
c22 = 1.532e−006 c24 = 1.299e−006 c26 = 8.487e−007 c28 = 5.730e−007 surface no. = 47

SPH  rdy = 1.000e+018 surface no. = 48

SPH  rdy 1.000e+018 surface no. = 49

ASP  rdy = −3.467e+002 a = 6.968e−002 b = 2.714e−001 c = −5.072e−001 d = 2.621e−001
e = 0.000e+000 f = 0.000e+000

Numerical Example 2

In the embodiment shown in FIG. 7, the horizontal angle of view of an image observed by an observer is ±12 degrees (in the paper plane), and the vertical angle of view thereof is ±9 degrees (perpendicular to the paper plane). The scanning surface (deflection point) of the scanning device is the 38$^{th}$ surface (equivalent to 203 in Embodiment 2), and the horizontal deflection angle of the scanning surface is ±6.2 degrees, the horizontal deflection angle thereof is ±7.2 degrees. The diameter of the entrance pupil is 1.0 mm.

Correspondence between the symbols in FIG. 7 and surface numbers (SUR) in Table 2 is as follows.

| | |
|---|---|
| Pupil 211 | Surface number 1 |
| Surface 210g | Surface number 3 |
| Surface 210f | Surface number 4 |
| Surface 210e | Surface number 5 |
| Surface 210d | Surface number 6 |
| Surface 210c | Surface number 7 |
| Surface 210b | Surface number 8 |
| Surface 210a | Surface number 9 |
| Reflective surface 207 | Surface number 11 |
| Surface 208a | Surface number 14, 21 |
| Surface 208b | Surface number 15, 20 |
| Surface 209 | Surface number 17 |
| Surface 205e | Surface number 25 |
| Surface 205d | Surface number 26 |
| Surface 205c | Surface number 27 |
| Surface 205b | Surface number 28 |
| Surface 205a | Surface number 29 |
| Surface 204a | Surface number 31, 43 |
| Surface 204b | Surface number 32, 42 |
| Surface 202d | Surface number 27 |
| Surface 202c | Surface number 48 |
| Surface 202b | Surface number 49 |
| Surface 202a | Surface number 50 |
| Light source 201 | Surface number 51 |

TABLE 2

| Type | sur | Yg | Zg | θg | ry | rx | d | shift | tilt | nd | vd |
|---|---|---|---|---|---|---|---|---|---|---|---|
| | 1 | .0000 | 0.0000 | 0.0000 | 0.0000 | 0.0000 | 0.000 | 0.000 | 0.000 | 1.000 | |
| | 2 | 0.0000 | 0.0000 | 0.0000 | 0.0000 | 0.0000 | 22.824 | 0.000 | 0.000 | 1.000 | |
| | 3 | 0.0000 | 22.8245 | 0.0000 | −17.8846 | −17.8846 | 1.500 | 0.000 | 0.000 | 1.847 | 23.78 |
| | 4 | 0.0000 | 24.3245 | 0.0000 | 52.1951 | 52.1951 | 1.524 | 0.000 | 0.000 | 1.000 | |
| | 5 | 0.0000 | 25.8486 | 0.0000 | −39.1743 | −39.1743 | 4.000 | 0.000 | 0.000 | 1.603 | 60.64 |
| | 6 | 0.0000 | 29.8486 | 0.0000 | −13.7497 | −13.7497 | 0.200 | 0.000 | 0.000 | 1.000 | |

TABLE 2-continued

|   |    |          |           |          |           |           |        |         |          |        |       |
|---|----|----------|-----------|----------|-----------|-----------|--------|---------|----------|--------|-------|
|   | 7  | 0.0000   | 30.0486   | 0.0000   | 64.2255   | 64.2255   | 9.703  | 0.000   | 0.000    | 1.694  | 53.20 |
|   | 8  | 0.0000   | 39.7513   | 0.0000   | −13.6685  | −13.6685  | 1.200  | 0.000   | 0.000    | 1.720  | 50.22 |
|   | 9  | 0.0000   | 40.9513   | 0.0000   | −21.9853  | −21.9853  | 12.500 | 0.000   | 0.000    | 1.000  |       |
|   | 10 | 0.0000   | 53.4513   | 0.0000   | 0.0000    | 0.0000    | 0.000  | 0.000   | 0.000    | 1.000  |       |
| M | 11 | 0.0000   | 53.45129  | −45.0000 | 0.0000    | 0.0000    | 0.000  | 0.000   | −45.000  | −1.000 |       |
|   | 12 | 0.0000   | 53.4513   | −90.0000 | 0.0000    | 0.0000    | 0.000  | 0.000   | −90.000  | −1.000 |       |
|   | 13 | 12.0000  | 53.4513   | −90.0000 | 0.0000    | 0.0000    | 0.000  | 12.000  | −90.000  | −1.000 |       |
|   | 14 | 12.0000  | 53.4513   | −90.0000 | −42.5959  | −42.5959  | 0.000  | 12.000  | −90.000  | −1.487 | 70.24 |
|   | 15 | 15.0000  | 53.4513   | −90.0000 | 132.0350  | 132.0350  | 0.000  | 15.000  | −90.000  | −1.000 |       |
|   | 16 | 25.7150  | 53.4513   | −90.0000 | 0.0000    | 0.0000    | 0.000  | 25.715  | −90.000  | −1.000 |       |
| M | 17 | 25.7150  | 53.45129  | −90.0000 | 0.0000    | 0.0000    | 0.000  | 25.715  | −90.000  | 1.000  |       |
|   | 18 | 25.7150  | 53.4513   | −90.0000 | 0.0000    | 0.0000    | 0.000  | 25.715  | −90.000  | 1.000  |       |
|   | 19 | 15.0000  | 53.4513   | −90.0000 | 0.0000    | 0.0000    | 0.000  | 15.000  | −90.000  | 1.000  |       |
|   | 20 | 15.0000  | 53.4513   | −90.0000 | 132.0350  | 132.0350  | 0.000  | 15.000  | −90.000  | 1.487  | 70.24 |
|   | 21 | 12.0000  | 53.4513   | −90.0000 | −42.5959  | −42.5959  | 0.000  | 12.000  | −90.000  | 1.000  |       |
|   | 22 | 12.0000  | 53.4513   | −90.000  | 0.0000    | 0.0000    | 0.000  | 12.000  | −90.000  | 1.000  |       |
|   | 23 | 0.0000   | 53.4513   | −90.0000 | 0.0000    | 0.0000    | 0.000  | 0.000   | −90.000  | 1.000  |       |
|   | 24 | −5.0000  | 53.4513   | −90.0000 | 0.0000    | 0.0000    | 0.000  | −5.000  | −90.000  | 1.000  |       |
| XYP | 25 | −5.0000  | 53.4513   | −90.0000 | −4.7759   | −4.7759   | 0.000  | −5.000  | −90.000  | 1.516  | 64.14 |
| XYP-M | 26 | −10.5000 | 53.4513   | −62.5679 | 30.1313   | 30.1313   | 5.725  | −10.500 | −62.568  | −1.516 | 64.14 |
| XYP-M | 27 | −6.4714  | 59.1758   | −70.8916 | −15.2213  | −15.2213  | 2.149  | −6.471  | −70.892  | 1.516  | 64.14 |
| XYP-M | 28 | −13.6570 | 61.3244   | −74.7632 | −19.9533  | −19.9533  | 4.763  | −13.657 | −74.763  | −1.516 | 64.14 |
| XYP | 29 | −9.2341  | 66.08757  | −42.8790 | −7.0697   | −7.0697   | 6.595  | −9.234  | −42.879  | −1.000 |       |
|   | 30 | −3.1100  | 72.6827   | −42.8790 | 0.0000    | 0.0000    | −4.397 | −3.110  | −42.879  | −1.000 |       |
|   | 31 | −7.1927  | 68.2859   | −57.8790 | 0.0000    | 0.0000    | 0.733  | −7.193  | −57.879  | −1.516 | 64.14 |
|   | 32 | −6.5123  | 69.0187   | −57.8790 | 0.0000    | 0.0000    | 3.664  | −6.512  | −57.879  | −1.000 |       |
|   | 33 | −3.1100  | 72.6827   | −42.8790 | 0.0000    | 0.0000    | 0.000  | −3.110  | −42.879  | −1.000 |       |
|   | 34 | −3.1100  | 72.6827   | −42.8790 | 0.0000    | 0.0000    | 0.000  | −3.110  | −42.879  | −1.000 |       |
|   | 35 | −3.1100  | 72.6827   | −62.8790 | 0.0000    | 0.0000    | 0.000  | −3.110  | −62.879  | −1.000 |       |
|   | 36 | −3.1100  | 72.6827   | −62.8790 | 0.0000    | 0.0000    | 0.000  | −3.110  | −62.879  | −1.000 |       |
|   | 37 | −3.1100  | 72.6827   | −62.8790 | 0.0000    | 0.0000    | 0.000  | −3.110  | −62.879  | −1.000 |       |
| M | 38 | −3.1100  | 72.68270  | −62.8790 | 0.0000    | 0.0000    | 0.000  | −3.110  | −62.879  | 1.000  |       |
|   | 39 | −3.1100  | 72.6827   | −42.8790 | 0.0000    | 0.0000    | 0.000  | −3.110  | −42.879  | 1.000  |       |
|   | 40 | −3.1100  | 72.6827   | −82.8790 | 0.0000    | 0.0000    | 0.000  | −3.110  | −82.879  | 1.000  |       |
|   | 41 | −3.1100  | 72.6827   | −82.8790 | 0.0000    | 0.0000    | −4.397 | −3.110  | −82.879  | 1.000  |       |
|   | 42 | −7.1927  | 68.2859   | −57.8790 | 0.0000    | 0.0000    | 0.000  | −7.193  | −57.879  | 1.516  | 64.14 |
|   | 43 | −7.1927  | 68.2859   | −57.8790 | 0.0000    | 0.0000    | 4.397  | −7.193  | −57.879  | 1.000  |       |
|   | 44 | −3.1100  | 72.6825   | −82.8790 | 0.0000    | 0.0000    | 0.000  | −3.110  | −82.879  | 1.000  |       |
|   | 45 | −3.1100  | 72.6825   | −82.8790 | 0.0000    | 0.0000    | 0.000  | −3.110  | −82.879  | 1.000  |       |
|   | 46 | −3.1100  | 72.6825   | −82.8790 | 0.0000    | 0.0000    | −0.930 | −3.110  | −82.879  | 1.000  |       |
| XYP | 47 | −10.5521 | 71.7528   | −82.8790 | 3.5724    | 3.5724    | −0.620 | −10.552 | −82.879  | 1.490  | 50.00 |
| XYP-M | 48 | −15.5136 | 71.1329   | −61.3790 | 6.4560    | 6.4560    | 3.837  | −15.514 | −61.379  | −1.490 | 50.00 |
| XYP-M | 49 | −12.3077 | 74.9699   | −57.3790 | 11.0944   | 11.0944   | −1.304 | −12.308 | −57.379  | 1.490  | 50.00 |
| XYP | 50 | −17.1346 | 73.66566  | −74.8790 | −32.4906  | −32.4906  | −1.043 | −17.135 | −74.879  | 1.000  |       |
|   | 51 | −20.9961 | 72.6222   | −74.8790 | 0.0000    | 0.0000    | 0.000  | −20.996 | −74.879  | 1.000  |       | surface no. = 3

SPH     rdy = −1.788e+001 surface no. = 4

SPH     rdy = 5.220e+001 surface no. = 5

SPH     rdy = −3.917e+001 surface no. = 6

SPH     rdy = −1.375e+001 surface no. = 7

SPH     rdy = 6.423e+001 surface no. = 8

SPH     rdy = −1.367e+001 surface no. = 9

SPH     rdy = −2.199e+001 surface no. = 14

SPH     rdy = −4.260e+001 surface no. = 15

SPH     rdy = 1.320e+002 surface no. = 25

XYP     rdy = −4.776e+000   c4 = 0.000e+000   c6 = 0.000e+000   c8 = 2.264e−001   c10 = 3.301e−003
               c11 = −5.453e−003   c13 = 0.000e+000   c17 = 4.828e−003   c19 = 0.000e+000   c21 = −1.199e−004
               c22 = 5.894e−004   c24 = −6.269e−004   c26 = −1.954e−005   c28 = 5.275e−006

TABLE 2-continued surface no. = 26

XYP    rdy = 3.013e+001 c4 = 0.000e+000 c6 = 0.000e+000 c8 = −2.162e−002 c10 = 8.885e−004
       c11 = 5.259e−005 c13 = 0.000e+000 c17 = 1.482e−003 c19 = 0.000e+000 c21 = 2.660e−005
       c22 = −1.466e−004 c24 = −3.377e−005 c26 = −5.081e−005 c28 = −2.613e−006 surface no. = 27

XYP    rdy = −1.522e+001 c4 = 0.000e+000 c6 = 0.000e+000 c8 = 1.975e−002 c10 = 2.090e−003
       c11 = −5.213e−003 c13 = 0.000e+000 c17 = −1.009e−002 c19 = 0.000e+000 c21 = −3.700e−005
       c22 = 4.601e−004 c24 = 3.506e−004 c26 = −5.779e−005 c28 = −1.810e−005 surface no. = 28

XYP    rdy = −1.995e+001 c4 = 0.000e+000 c6 = 0.000e+000 c8 = 9.331e−003 c10 = 5.004e−004
       c11 = −3.706e−005 c13 = 0.000e+000 c17 = −1.879e−004 c19 = 0.000e+000 c21 = 1.004e−006
       c22 = −4.201e−007 c24 = 2.253e−007 c26 = −1.459e−006 c28 = 5.123e−007 surface no. = 29

XYP    rdy = −7.070e+000 c4 = 0.000e+000 c6 = 0.000e+000 c8 = 1.324e−001 c10 = 1.332e−003
       c11 = −3.279e−004 c13 = 0.000e+000 c17 = −1.010e−003 c19 = 0.000e+000 c21 = −4.932e−005
       c22 = 1.532e−006 c24 = 1.299e−006 c26 = 8.487e−007 c28 = 5.730e−007 surface no. = 47

XYP    rdy = 3.572e+000 c4 = 0.000e+000 c6 = 0.000e+000 c8 = −1.097e−001 c10 = 0.000e+000
       c11 = 0.000e+000 c13 = 0.000e+000 c17 = 0.000e+000 c19 = 0.000e+000 c21 = 0.000e+000
       c22 = 0.000e+000 c24 = 0.000e+000 c26 = 0.000e+000 c28 = 0.000e+000 surface no. = 48

XYP    rdy = 6.456e+000 c4 = 0.000e+000 c6 = 0.000e+000 c8 = −4.031e−002 c10 = 0.000e+000
       c11 = 0.000e+000 c13 = 0.000e+000 c17 = 0.000e+000 c19 = 0.000e+000 c21 = 0.000e+000
       c22 = 0.000e+000 c24 = 0.000e+000 c26 = 0.000e+000 c28 = 0.000e+000 surface no. = 49

XYP    rdy = 1.109e+001 c4 = 0.000e+000 c6 = 0.000e+000 c8 = −3.656e−003
       c10 = 0.000e+000
       c11 = 0.000e+000 c13 = 0.000e+000 c17 = 0.000e+000 c19 = 0.000e+000 c21 = 0.000e+000
       c22 = 0.000e+000 c24 = 0.000e+000 c26 = 0.000e+000 c28 = 0.000e+000 surface no. = 50

XYP    rdy = −3.249e+001 c4 = 0.000e+000 c6 = 0.000e+000 c8 = −3.172e−003 c10 = 0.000e+000
       c11 = 0.000e+000 c13 = 0.000e+000 c17 = 0.000e+000 c19 = 0.000e+000 c21 = 0.000e+000
       c22 = 0.000e+000 c24 = 0.000e+000 c26 = 0.000e+000 c28 = 0.000e+000

Numerical Example 3

In the embodiment shown in FIG. 8, the horizontal angle of view of an image observed by an observer is ±12 degrees (in the paper plane), and the vertical angle of view thereof is ±8 degrees (perpendicular to the paper plane). The scanning surface (deflection point) of the scanning device is the $31^{st}$ surface (equivalent to 403 in Embodiment 3), and the horizontal deflection angle of the scanning surface is ±4.5 degrees, the horizontal deflection angle thereof is ±3.2 degrees. The entrance pupil diameter is 1.0 mm.

Correspondence between the symbols in FIG. 8 and surface numbers (SUR) in Table 3 is as follows.

| | |
|---|---|
| Pupil 411 | Surface number 1 |
| Surface 414b | Surface number 3 |
| Surface 414a | Surface number 4 |
| Surface 410 | Surface number 6, 8, 14 |
| Surface 408 | Surface number 9, 13 |
| Surface 407 | Surface number 7, 15 |
| Reflective surface 412 | Surface number 11 |
| Surface 415 | Surface number 18 |
| Surface 405a | Surface number 20, 24 |
| Surface 405b | Surface number 21, 23 |
| Surface 405c | Surface number 35 |
| Surface 402b | Surface number 36 |
| Light source 401 | Surface number 37 |

TABLE 3

| Type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 0.000 | 0.000 | 0.000 | 1.000 | |
| | 2 | 0.0000 | 0.0000 | 0.0000 | 0.0000 | 0.0000 | 20.000 | 0.000 | 0.000 | 1.000 | |
| | 3 | 0.0000 | 20.0000 | 0.0000 | −34.7269 | −34.7269 | 4.000 | 0.000 | 0.000 | 1.516 | 64.14 |
| | 4 | 0.0000 | 24.0000 | 0.0000 | −15.6296 | −15.6296 | 2.000 | 0.000 | 0.000 | 1.000 | |
| | 5 | 0.0000 | 26.0000 | 0.0000 | 0.0000 | 0.0000 | 0.000 | 0.000 | 0.000 | 1.000 | |
| XYP | 6 | −4.3734 | 26.0000 | 0.5208 | −1248.0547 | −1248.0547 | 8.500 | −4.373 | 0.521 | 1.490 | 50.00 |
| XYP-M | 7 | 5.0000 | 34.5000 | −24.0000 | −120.7138 | −120.7138 | −8.500 | 5.000 | −24.000 | −1.490 | 50.00 |
| XYP-M | 8 | −4.3734 | 26.0000 | 0.5208 | −1248.0547 | −1248.054 | 8.000 | −4.373 | 0.521 | 1.490 | 50.00 |

TABLE 3-continued

| | | | | | | | | | | | |
|---|---|---|---|---|---|---|---|---|---|---|---|
| SPH | 9 | 20.0000 | 34.0000 | 52.0000 | −17.0714 | −17.0714 | 0.000 | 20.000 | 52.000 | 1.000 | |
| | 10 | 20.0000 | 34.0000 | 52.0000 | 0.0000 | 0.0000 | 3.117 | 20.000 | 52.000 | 1.000 | |
| M | 11 | 23.9101 | 37.11660 | 60.7990 | 0.0000 | 0.0000 | −0.038 | 23.910 | 60.799 | −1.000 | |
| | 12 | 23.9401 | 37.0783 | 52.0000 | 0.0000 | 0.0000 | −3.078 | 23.940 | 52.000 | −1.000 | |
| | 13 | 20.0000 | 34.0000 | 52.0000 | −17.0714 | −17.0714 | −8.000 | 20.000 | 52.000 | −1.490 | 50.00 |
| XYP-M | 14 | −4.3734 | 26.0000 | 0.5208 | −1248.0547 | −1248.0547 | 8.500 | −4.373 | 0.521 | 1.490 | 50.00 |
| XYP | 15 | 5.0000 | 34.5000 | −24.0000 | −120.7138 | −120.7138 | 0.000 | 5.000 | −24.000 | 1.490 | 50.00 |
| | 16 | 5.0000 | 34.5000 | −24.0000 | 0.0000 | 0.0000 | −1.607 | 5.000 | −24.000 | 1.490 | 50.00 |
| | 17 | 1.3904 | 32.8929 | −51.4934 | 0.0000 | 0.0000 | 0.000 | 1.390 | −51.493 | 1.490 | 50.00 |
| | 18 | 1.3904 | 32.8929 | −51.4934 | 0.0000 | 0.0000 | 2.490 | 1.390 | −51.493 | 1.000 | |
| | 19 | −1.7398 | 35.3833 | −51.4934 | 0.0000 | 0.0000 | 0.000 | −1.740 | −51.493 | 1.000 | |
| XYP | 20 | −1.7398 | 35.3833 | −51.4934 | 22.1550 | 22.1550 | 4.047 | −1.740 | −51.493 | 1.490 | 50.00 |
| XYP-M | 21 | −6.8263 | 39.4302 | −16.4934 | −134.7072 | −134.7072 | −4.741 | −6.826 | −16.493 | −1.490 | 50.00 |
| XYP-M | 22 | −8.4133 | 34.6888 | 29.5066 | 28.0665 | 28.0665 | 4.741 | −8.413 | 29.507 | 1.490 | 50.00 |
| XYP-M | 23 | −6.8263 | 39.4302 | −16.4934 | −134.7072 | −134.7072 | −4.047 | −6.826 | −16.493 | −1.490 | 50.00 |
| XYP | 24 | −1.7398 | 35.38330 | −51.4934 | 22.1550 | 22.1550 | 3.373 | −1.740 | −51.493 | 1.490 | 50.00 |
| | 25 | −0.3163 | 38.7560 | −71.6051 | 0.0000 | 0.0000 | 0.000 | −0.316 | −71.605 | −1.000 | |
| | 26 | −0.3163 | 38.7560 | −71.6051 | 0.0000 | 0.0000 | −2.209 | −0.316 | −71.605 | −1.000 | |
| | 27 | 6.3260 | 36.5470 | −71.6051 | 0.0000 | 0.0000 | 0.000 | 6.326 | −71.605 | −1.000 | |
| | 28 | 6.3260 | 36.5470 | −51.6051 | 0.0000 | 0.0000 | 0.000 | 6.326 | −51.605 | −1.000 | |
| | 29 | 6.3260 | 36.5470 | −51.6051 | 0.0000 | 0.0000 | 0.000 | 6.326 | −51.605 | −1.000 | |
| | 30 | 6.3260 | 36.5470 | −51.6051 | 0.0000 | 0.0000 | 0.000 | 6.326 | −51.605 | −1.000 | |
| M | 31 | 6.3260 | 36.54704 | −51.6051 | 0.0000 | 0.0000 | 0.000 | 6.326 | −51.605 | 1.000 | |
| | 32 | 6.3260 | 36.5470 | −71.6051 | 0.0000 | 0.0000 | 0.000 | 6.326 | −71.605 | 1.000 | |
| | 33 | 6.3260 | 36.5470 | −31.6051 | 0.0000 | 0.0000 | 0.000 | 6.326 | −31.605 | 1.000 | |
| | 34 | 6.3260 | 36.5470 | −31.6051 | 0.0000 | 0.0000 | 6.543 | 6.326 | −31.605 | 1.000 | |
| SPH | 35 | 1.6933 | 43.0896 | −35.3020 | 8.5517 | 8.5517 | 4.081 | 1.693 | −35.302 | 1.516 | 64.14 |
| | 36 | −1.1961 | 47.1702 | −35.3020 | −5.5260 | −5.5260 | 8.161 | −1.196 | −35.302 | 1.000 | |
| | 37 | −6.9750 | 55.3314 | −35.3020 | 0.0000 | 0.0000 | 0.000 | −6.975 | −35.302 | 1.000 | | surface no. = 6

XYP  rdy = −1.248e+003 c4 = 0.000e+000 c6 = 0.000e+000 c8 = −3.087e−003 c10 = 8.077e−005
c11 = −2.564e−005 c13 = 0.000e+000 c17 = −1.299e−005 c19 = 0.000e+000 c21 = 0.000e+000
c22 = 0.000e+000 c24 = 0.000e+000 c26 = 0.000e+000 c28 = 0.000e+000 surface no. = 7

XYP  rdy = −1.207e+002 c4 = 0.000e+000 c6 = 0.000e+000 c8 = 2.880e−004 c10 = 7.196e−005
c11 = 2.956e−006 c13 = 0.000e+000 c17 = 4.743e−006 c19 = 0.000e+000 c21 = 0.000e+000
c22 = 0.000e+000 c24 = 0.000e+000 c26 = 0.000e+000 c28 = 0.000e+000 surface no. = 8

XYP  rdy = −1.248e+003 c4 = 0.000e+000 c6 = 0.000e+000 c8 = −3.087e−003 c10 = 8.077e−005
c11 = −2.564e−005 c13 = 0.000e+000 c17 = −1.299e−005 c19 = 0.000e+000 c21 = 0.000e+000
c22 = 0.000e+000 c24 = 0.000e+000 c26 = 0.000e+000 c28 = 0.000e+000 surface no. = 9

SPH  rdy = −1.707e+001 surface no. = 13

SPH  rdy = −1.707e+001 surface no. = 14

XYP  rdy = −1.248e+003 c4 0.000e+000 c6 = 0.000e+000 c8 = −3.087e−003 c10 = 8.077e−005
c11 = −2.564e−005 c13 = 0.000e+000 c17 = −1.299e−005 c19 = 0.000e+000 c21 = 0.000e+000
c22 = 0.000e+000 c24 = 0.000e+000 c26 = 0.000e+000 c28 = 0.000e+000 surface no. = 15

XYP  rdy = −1.207e+002 c4 = 0.000e+000 c6 = 0.000e+000 c8 = 2.880e−004 c10 = 7.196e−005
c11 = 2.956e−006 c13 = 0.000e+000 c17 = 4.743e−006 c19 = 0.000e+000 c21 = 0.000e+000
c22 = 0.000e+000 c24 = 0.000e+000 c26 = 0.000e+000 c28 = 0.000e+000 surface no. = 20

XYP  rdy = 2.215e+001 c4 = 0.000e+000 c6 = 0.000e+000 c8 = 6.293e−002 c10 = −2.257e−004
c11 = −3.360e−004 c13 = 0.000e+000 c17 = −1.769e−003 c19 = 0.000e+000 c21 = 0.000e+000
c22 = 0.000e+000 c24 = 0.000e+000 c26 = 0.000e+000 c28 = 0.000e+000 surface no. = 21

XYP  rdy = −1.347e+002 c4 = 0.000e+000 c6 = 0.000e+000 c8 = −1.257e−005 c10 = 1.113e−004
c11 = 0.000e+000 c13 = 0.000e+000 c17 = 0.000e+000 c19 = 0.000e+000 c21 = 0.000e+000
c22 = 0.000e+000 c24 = 0.000e+000 c26 = 0.000e+000 c28 = 0.000e+000 surface no. = 22

XYP  rdy = 2.807e+001 c4 = 0.000e+000 c6 = 0.000e+000 c8 = 5.331e−004 c10 = 6.858e−004
c11 = −1.795e−004 c13 = 0.000e+000 c17 = −3.467e−004 c19 = 0.000e+000 c21 = 0.000e+000
c22 = 0.000e+000 c24 = 0.000e+000 c26 = 0.000e+000 c28 = 0.000e+000

TABLE 3-continued surface no. = 23

| | |
|---|---|
| XYP | rdy = −1.347e+002 c4 = 0.000e+000 c6 = 0.000e+000 c8 = −1.257e−005 c10 = 1.113e−004<br>c11 = 0.000e+000 c13 = 0.000e+000 c17 = 0.000e+000 c19 = 0.000e+000 c21 = 0.000e+000<br>c22 = 0.000e+000 c24 = 0.000e+000 c26 = 0.000e+000 c28 = 0.000e+000 | surface no. = 24

| | |
|---|---|
| XYP | rdy = 2.215e+001 c4 = 0.000e+000 c6 = 0.000e+000 c8 = 6.293e−002 c10 = −2.257e−004<br>c11 = −3.360e−004 c13 = 0.000e+000 c17 = −1.769e−003 c19 = 0.000e+000 c21 = 0.000e+000<br>c22 = 0.000e+000 c24 = 0.000e+000 c26 = 0.000e+000 c28 = 0.000e+000 | surface no. = 35

| | |
|---|---|
| ASP | rdy = 8.552e+000 a = −1.083e−003 b = −3.528e−004 c = 0.000e+000 d = 0.000e+000<br>e = 0.000e+000 f = 0.000e+000 | surface no. = 36

| | |
|---|---|
| SPH | rdy = −5.526e+000 |

As has been described above, according to the above-described respective embodiments, it becomes possible to provide an optical system having a small size as a whole and capable of suppressing loss in the light amount in the separating member even when a relatively large-sized scanning device and a reflection-type diffusing member are used and to provide a scan-type image display apparatus provided with the same.

While preferred embodiments have been described, it is to be understood that modification and variation of the present invention may be made without departing from scope of the following claims.

What is claimed is:

1. An optical system comprising:
   a separating member;
   a scanning optical system which scans a light flux from a light source through the separating member on a scan surface, the scanning optical system including a scanning device which scans the light flux from the light source at a scanning point, an image-forming optical system which leads the light flux emitted from the scanning device to the separating member, and a common optical system which leads the light flux emitted from the separating member to the scan surface; and
   a display optical system which leads
   the light flux emitted from the scanning optical system to the separating member through the common optical system and which leads the light flux from the separating member to an optical path different from an optical path of the scanning optical system,
   wherein the position of the scanning point and the position of the separating member have substantially a conjugate relationship.

2. The optical system according to claim 1, wherein the scanning optical system which scans the light flux from the light source on a predetermined scan surface, and the scan surface is disposed at substantially a focal point position of the display optical system.

3. The optical system according to claim 2, wherein the scan surface is a reflective diffusing plate.

4. The optical system according to claim 1, wherein the scanning point and the exit pupil of the optical system have a conjugate relationship.

5. The optical system according to claim 1, wherein an optical element is provided, in the optical path of the display optical system, at a part which does not overlap with the optical path of the scanning optical system.

6. The optical system according to claim 1, wherein the optical system has at least a first reflecting surface and a second reflecting surface which reflects a ray in the light flux emitted from a pupil in the first surface back toward the first surface, and the first surface reflects the ray in a direction substantially normal to a hit point of the ray on the first surface.

7. The optical system according to claim 1, wherein the optical system includes a reflective surface which reflects a ray in the light flux a plurality of times and is decentered with respect to an optical path,
   which results in an inner product formed between outer products, each formed by vectors of incident light and reflected light performed the plurality of times, which is negative.

8. A scan-type image display apparatus comprising:
   a light source;
   a driving circuit which modulates the light source; and
   the optical system according to claim 1.

9. An image display system comprising:
   the scan-type image display apparatus according to claim 8; and
   an image supply apparatus which supplies an image signal to the image display apparatus.

10. The optical system according to claim 1, wherein the image-forming optical system leads the light flux emitted from the scanning point to an aperture of the separating member, and the position of the scanning point and the position of the aperture have substantially a conjugate relationship.

* * * * *

UNITED STATES PATENT AND TRADEMARK OFFICE
CERTIFICATE OF CORRECTION

| | |
|---|---|
| PATENT NO. | : 7,183,539 B2 |
| APPLICATION NO. | : 10/847119 |
| DATED | : February 27, 2007 |
| INVENTOR(S) | : Shuichi Kobayashi et al. |

Page 1 of 1

It is certified that error appears in the above-identified patent and that said Letters Patent is hereby corrected as shown below:

TITLE PAGE, ITEM (56)

Under References Cited,

U.S. Patent Documents, "5,982,553 A* 11/1999 Bloom"

should read --5,982,553 A* 11/1999 Bloom et al.--.

Signed and Sealed this

Twenty-fifth Day of March, 2008

JON W. DUDAS
*Director of the United States Patent and Trademark Office*